(12) United States Patent
Yamamoto

(10) Patent No.: US 7,207,681 B2
(45) Date of Patent: Apr. 24, 2007

(54) PROJECTION DISPLAY DEVICE WITH OPTICAL COMBINER BETWEEN FIRST LENS GROUP AND SEPARATE SECOND LENS GROUPS

(75) Inventor: Chikara Yamamoto, Kodaira (JP)

(73) Assignee: Fujinon Corporation, Saitama (JP)

( * ) Notice: Subject to any disclaimer, the term of this patent is extended or adjusted under 35 U.S.C. 154(b) by 144 days.

(21) Appl. No.: 11/019,155

(22) Filed: Dec. 23, 2004

(65) Prior Publication Data

US 2005/0140939 A1 Jun. 30, 2005

(30) Foreign Application Priority Data

Dec. 25, 2003 (JP) .............................. 2003-430095

(51) Int. Cl.
 G03B 21/20 (2006.01)
 G03B 21/26 (2006.01)
 G02B 9/00 (2006.01)
(52) U.S. Cl. .................... 353/102; 353/30; 359/649
(58) Field of Classification Search ................ 353/20, 353/30, 31, 33, 34, 37, 98; 359/648–655, 359/663, 672–706, 737, 708–719, 754–797
See application file for complete search history.

(56) References Cited

FOREIGN PATENT DOCUMENTS

| JP | H9-61711 | 3/1997 |
|---|---|---|
| JP | H10-268235 | 10/1998 |
| JP | 3175411 | 4/2001 |
| JP | 2001-154152 | 6/2001 |

*Primary Examiner*—Melissa Jan Koval
*Assistant Examiner*—Andrew Kong
(74) *Attorney, Agent, or Firm*—Arnold International; Jon W. Henry; Bruce Y. Arnold

(57) ABSTRACT

A projection display device for enlarging and projecting an image includes a first lens group on the enlarging end of the projection display device, a plurality of display elements, each modulating a different one of a plurality of light beams with image information, an optical combiner for receiving from different directions different light beams modulated by different display elements, combining the modulated light beams, and directing the combined modulated light beams along an optical axis to the first lens group, and a plurality of second lens groups, each arranged on a separate optical axis so that a different one of the modulated light beams modulated by a different display element on the separate optical axis passes through one of the second lens groups before being incident on the optical combiner. The projection optical device satisfies certain conditions related to focal lengths and size of the display elements.

30 Claims, 22 Drawing Sheets

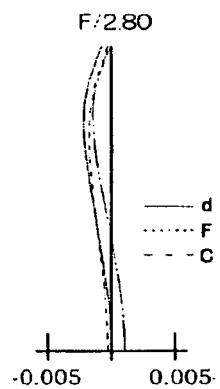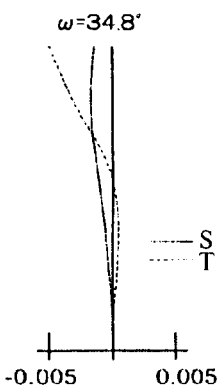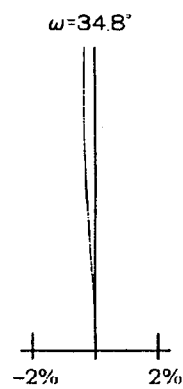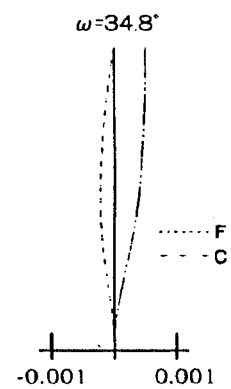
Fig. 14A  Fig. 14B  Fig. 14C  Fig. 14D
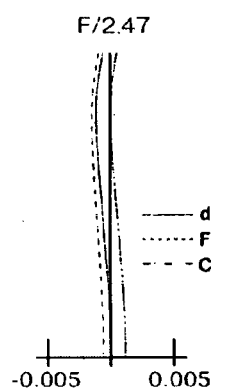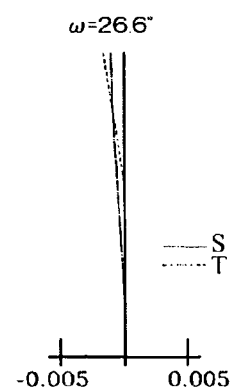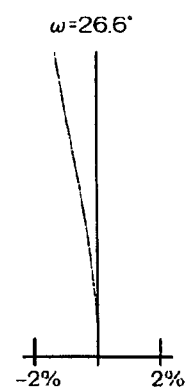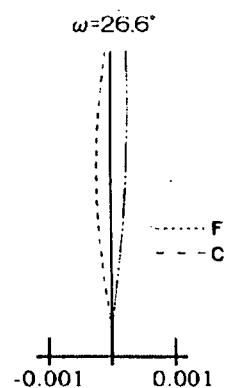
Fig. 15A  Fig. 15B  Fig. 15C  Fig. 15D
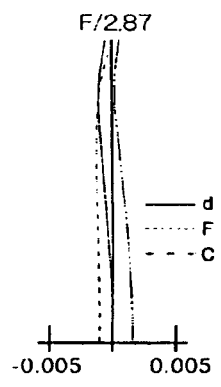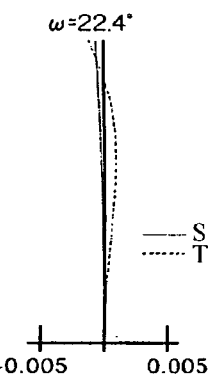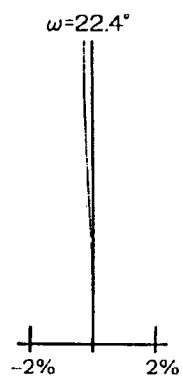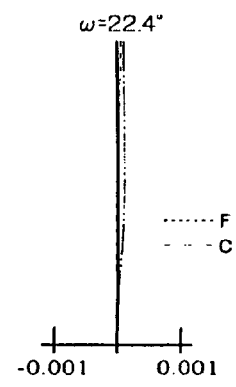
Fig. 16A  Fig. 16B  Fig. 16C  Fig. 16D

PROJECTION DISPLAY DEVICE WITH OPTICAL COMBINER BETWEEN FIRST LENS GROUP AND SEPARATE SECOND LENS GROUPS

FIELD OF THE INVENTION

The present invention relates to a projection display device that includes display elements that are arranged in arrays to modulate light by variable reflection, transmission, or direction of reflection or transmission so as to operate generally as light valves. The display elements may be small reflecting elements, for example, small mirrors or reflection-type liquid crystal display elements, or small transmitting elements, for example, transmission-type liquid crystal display elements. The present invention further relates to such a projection display device that has high projection performance but can be made small and compact, particularly by the design of the optics used in the projection display device.

BACKGROUND OF THE INVENTION

Recently, the projector market has grown along with widespread use of personal computers. Known display elements for modulating light beams with image information in a projector include small reflective elements, such as digital mirror devices (hereinafter termed the DMDs) from Texas Instruments, and transmission-type and reflection-type liquid crystal display elements arranged in a regular array. Reflection-type display elements are suitable for creating small pixels highly efficiently and have become the focus of attention as display elements for producing projected images of high quality.

Projection display devices using reflection-type liquid crystal display elements are disclosed, for example, in Japanese Laid-Open Patent Application H10-268235 and Japanese Laid-Open Patent Application 2001-154152. FIGS. 28 and 29 show known structures of projection display devices that use reflection-type liquid crystal display elements. The devices shown in FIGS. 28 and 29 separate white light from a light source (not shown) into three light beams of different colors, for example, green, blue, and red, and modulate the three light beams with image information by reflection from reflection-type liquid crystal display elements. As shown in FIG. 28 and FIG. 29, the light beams are modulated with image information by reflection from reflection-type liquid crystal panels 321a to 321c (FIG. 28) or 421a to 421c (FIG. 29) and then are combined before they reach a projection lens 330 (FIG. 28) or 430 (FIG. 29). The reflection-type liquid crystal panels 321a to 321c or 421a to 421c correspond to the three color light beams, for example, green, blue, and red in an arbitrary order, which is true in general of the prior art embodiments described herein. In FIG. 28 and FIG. 29, the optical paths of the respective color light beams are shown schematically. In FIG. 28, the solid and dotted lines indicate two different polarization states.

In the projection display devices of FIG. 28 and FIG. 29, the reflection-type liquid crystal panels 321a to 321c (FIG. 28) and 421a to 421c (FIG. 29) face the prism surfaces of polarization sensitive beam splitting prisms (hereinafter termed PBSs) 319 and 326 (FIG. 28) and 419a to 419c (FIG. 29) for separating an illumination light beam that comes from a light source (not shown in the drawings) from a projection light beam that travels to the projection lens via quarter-wavelength plates 320a to 320c (FIG. 28) or 420a to 420c (FIG. 29) for improving the contrast of a projected image. The device of FIG. 28 includes dichroic prisms 329 and 343, a wavelength specific polarization conversion element 342 for converting the polarization of a specific wavelength band of a light beam, and prism joints 318, 322, 325, and 327. The prism joints 325 and 327 include the wavelength specific polarization conversion elements. The device of FIG. 29 includes dichroic mirrors 416 and 470, a total reflection mirror 474, and an X-shaped dichroic prism.

Projection display devices that use transmission-type liquid crystal display elements are disclosed, for example, in Japanese Patent Publication 3175411 and Japanese Laid-Open Patent Application H09-61711. FIGS. 30 and 31 show known structures of projection display devices using transmission-type liquid crystal display elements. The devices shown in FIGS. 30 and 31 separate white light from a light source (not shown) into three light beams of different colors, for example, green, blue, and red, and modulate the three light beams with image information by transmission through the transmission-type liquid crystal display elements. As shown in FIG. 30 and FIG. 31, the light beams are modulated with image information by transmission through the transmission-type liquid crystal panels 571a to 571c (FIG. 30) or 671a to 671c (FIG. 31) and then are combined before they reach a projection lens 530 (FIG. 30) or 630 (FIG. 31). These devices include dichroic mirrors 516 and 570 (FIG. 30) and 616 and 670 (FIG. 31) for separating the light beams of different colors, condenser lenses 577a to 577c (FIG. 30) and 677a to 677c (FIG. 31), and total reflection mirrors 574a and 574b (FIG. 30) and 674a to 674c (FIG. 31). The device shown in FIG. 30 includes field lenses 580a to 580c on the projection lens side of the transmission-type liquid crystal panels 571a to 571c and dichroic mirrors 578 and 579 for combining the modulated light beams of different colors. In this device, the projected light beam modulated with image information is projected by one of the field lenses 580a to 580c and the projection lens 530. The device shown in FIG. 31 includes an X-shaped dichroic prism for the light beams of different colors that are modulated with image information.

As seen from the projection display devices described in Japanese Laid-Open Patent Applications H10-268235 and 2001-154152, cited above, and the structures shown in FIGS. 28 and 29, the projection display devices using multiple reflection-type liquid crystal display elements requires an optical combiner for combining light beams from the display elements, for example, the dichroic prism 329 (FIG. 28) or the X-shaped dichroic prism 448 (FIG. 29) and light separating structures for separating the illumination light beam from the projection light beam, for example, the PBSs 319 and 326 (FIG. 28) and PBSs 419a to 419c (FIG. 29). This is also true if multiple DMDs are used as the display elements. In the prior art, the optical combiner and the light separating structures are included between the side of the projection lens opposite the enlarging side, that is, on the reducing side, and the display elements.

Therefore, the projection lens in the prior art projection devices is required to have a very large back focal length. However, projection lenses in recent projection display devices tend to have small back focal lengths and a large field angle in order to project an image to a large screen with a small distance between the projection lens and the screen. Projection lenses for use in front projectors intended for use in very limited spaces such as homes or in rear projection TVs where overall size and thickness of the projectors must be kept small are demanded to have a large field angle. It is difficult to design a wide-angle lens having excellent optical performance for a projection display device having a large back focal length as described above. A certain quality of optical performance can be obtained by using expensive glass materials, but this leads to high cost of the lens. A large back focal length requires lens components of the projection lens to have relatively large diameters, particularly on the enlarging end of the lens, which tends to increase both size and cost of the projection lens.

The projection display device described in Japanese Patent Publication 3175411 and the structure shown in FIG. 30 use field lenses relatively near the display elements, as shown for example in FIG. 30, by field lenses 580a to 580c. This avoids increasing the back focal length of the projection lens. Thus, the projection lens and the entire projection display device can be made small and compact. When the field lenses 580a to 580c have very large focal lengths, the optical system for combining the different color light beams becomes larger, which leads to the same problem of excessive size discussed above. On the other hand, a certain distance should be maintained for combining light beams of different colors, for example, as shown in FIG. 30 by the light beams transmitted through the field lenses 580a and 580b being combined together with another color light beam via two dichroic mirrors 578 and 579 in order to form a projection light beam. Therefore, the focal lengths have to be within a very limited range. Such limiting of the powers of the field lenses makes it difficult to design a projection lens generally. That is, it is difficult to obtain a lens system that has excellent optical performance and can be produced at low cost.

The projection display device described in Japanese Laid-Open Patent Application H09-61711 and the device shown in FIG. 31 use an X-shaped dichroic prism, shown in FIG. 31 as X-shaped dichroic prism 648 provided on the side of the projection lens 630 opposite the enlarging side, that is, on the reducing side, for combining light beams of three different colors. This facilitates the projection lens having a relatively small back focal length, and, accordingly, enables designing a lens system having excellent optical performance and low cost. However, with this structure, lines crossing the projected image, related to structural characteristics of the X-shaped dichroic prism 648, may be visible in the projected image.

BRIEF SUMMARY OF THE INVENTION

The present invention relates to a projection display device using a projection lens that has excellent optical performance, with a compact design, that can be produced at low cost, and that produces less visible lines crossing a projected image on a screen with the use of an X-shaped dichroic prism for combining beams of different colors for projection through the projection lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 14A–14D show the spherical aberration, astigmatism, distortion, and lateral color, respectively, of the projection lens according to Embodiment 1;

FIGS. 15A–15D show the spherical aberration, astigmatism, distortion, and lateral color, respectively, of the projection lens according to Embodiment 2 at the wide-angle end;

FIGS. 16A–16D show the spherical aberration, astigmatism, distortion, and lateral color, respectively, of the projection lens according to Embodiment 2 at the telephoto end;

DETAILED DESCRIPTION

A general description of the projection display device of the present invention that pertains to all the embodiments of the invention will first be described with reference to FIG. 1 that shows Embodiment 1. In the projection display device of the present invention, a white light beam from a light source is separated into light beams of different colors, one of each of the light beams of different colors is modulated by a different display element, and the light beams of different colors modulated by the display elements are combined and projected by a projection lens according to the present invention in order to form a desired image on a screen. The display elements of the projection display device shown in FIG. 1 that modulate the different color light beams with image information are reflection-type liquid crystal panels (hereinafter termed RLCDs).

The separated light beams of different colors, which, for example, may be green, blue, and red, are hereinafter referred to as first, second, and third color light beams for convenience. The RLCDs are arranged so that each of the RLCDs receives a separated light beam of a particular color in order to modulate the separated light beam with image information corresponding to the particular color. The optical paths of the different color light beams are schematically shown in FIG. 1 in order to illustrate the operation of the projection display device. The solid and dotted lines in FIG. 1 (and similarly in FIGS. 3 and 25 to be described later) indicate two light beams that are linearly polarized in orthogonal directions with respect to one another. In the following explanations, it is assumed that the solid lines indicate S polarized light and the dotted lines indicate P polarized light.

Figure 1:
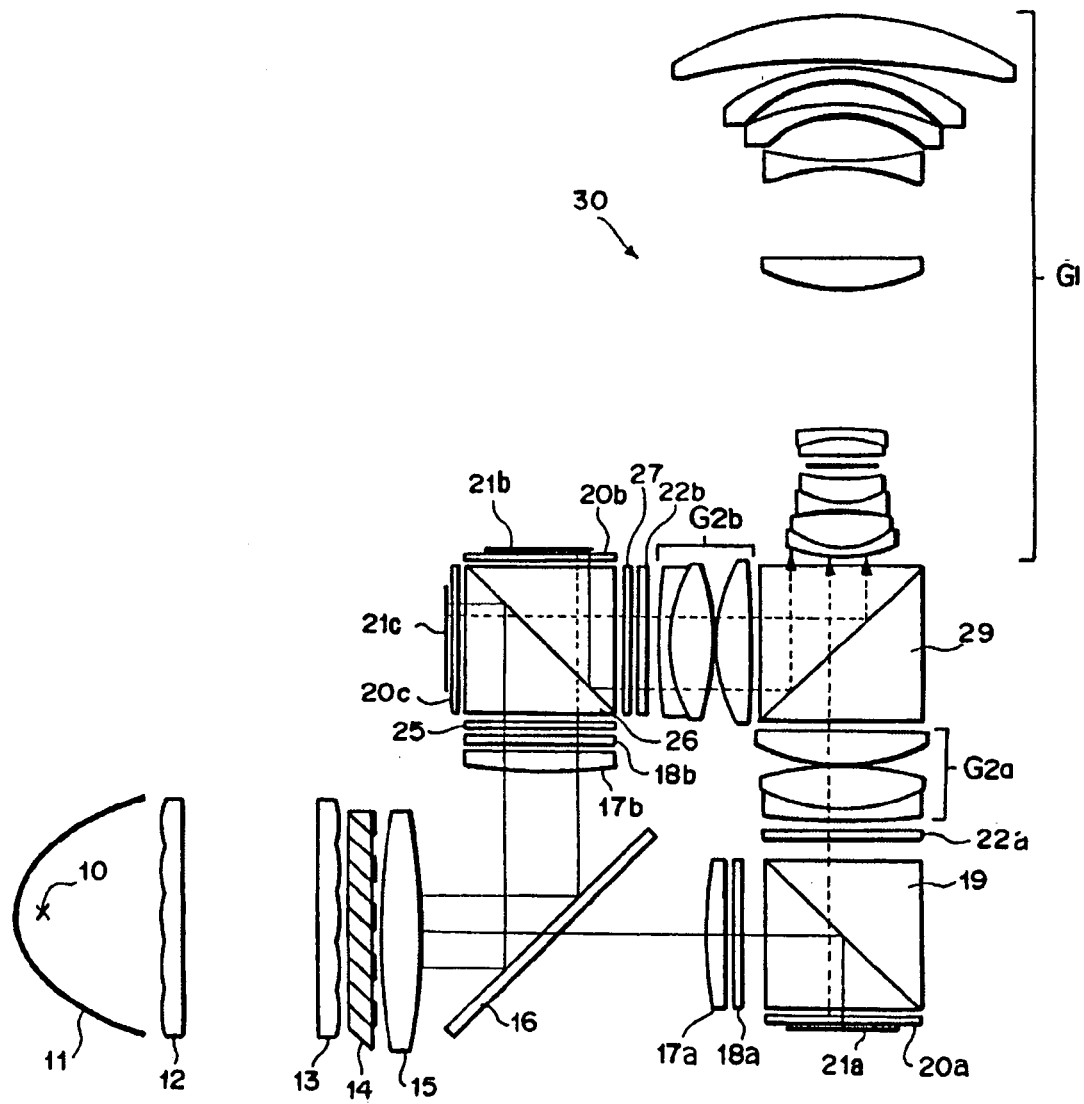
FIG. 1 shows a cross-sectional view of a projection display device according to Embodiment 1.

As shown in FIG. 1, a dichroic mirror 16 receives a uniformly polarized and nearly uniform in cross-sectional light intensity white light beam from a light source lamp 10. The dichroic mirror 16 separates the white light beams into two light beams of different colors directed in different directions in order to illuminate RLCDs 21a, 21b, and 21c via polarization sensitive beam splitters, which are beam splitting prisms (PBSs) 19 and 26, that operate as light separating structures for separating the illumination light from the projection light. Each of the light beams reflected by the RLCD 21a, 21b, or 21c and modulated with image information of a respective color enters the PBS 19 or the PBS 26 and exits the PBS 19 or the PBS 26 and enters the second lens group G2a or the second lens group G2b, with both lens groups G2a and G2b being part of a projection lens 30. The projection lens 30 is provided with an optical combiner for combining the modulated light beams of different colors so that the light beams are projected as a composite light beam. In this way, images displayed on the RLCDs 21a, 21b, and 21c may be enlarged and projected as a full color image on a screen (not shown in FIG. 1).

The projection lens 30 includes, from the enlarging side, a first lens group G1 having positive refractive power, a dichroic prism 29 that includes a dichroic surface as an optical combiner for combining light beams incident from at least two different directions from multiple display elements, and second lens groups G2a and G2b that each have positive refractive power. The second lens groups G2a and G2b are arranged so that the modulated light beam from each of the display elements pass through only one of the second lens groups before being incident on the optical combiner 29 (dichroic prism 29).

In general terms, in the present invention, a projection display device for enlarging and projecting an image along a projection optical axis includes a first lens group arranged on the projection optical axis on the enlarging end of the projection display device, a plurality of display elements, each modulating a different one of a plurality of light beams with image information, an optical combiner for receiving from at least two different directions light beams modulated by the different display elements, combining the modulated light beams, and directing the combined modulated light beams along an optical axis to the first lens group, and a plurality of second lens groups, each having positive refractive power and each arranged on a separate optical axis so that a different one of the light beams modulated by a different display element is incident on the optical combiner after passing through a different one of the second lens groups.

In the projection display device of FIG. 1, among the projection light beams carrying the respective color light image information, the first color light beam enters the dichroic prism 29 via the second lens group G2a while the second and third color light beams enter the dichroic prism 29 via the second lens group G2b. The dichroic prism 29 transmits the first color light beam and reflects the second and third color light beams at a right angle, whereby the three color light beams are combined before they are enlarged and projected by the first lens group G1. In this projection display device, the second lens group G2a and first lens group G1 serve as the projection lens 30 for the first color light beam, and the second lens group G2b and the first lens group G1 serve as the projection lens 30 for the second and third color light beams.

The projection display device, including the projection lens 30, is constructed so as to satisfy the following conditions (A) to (C) for each of the plurality of second lens groups:

| | |
|---|---|
| $1.0 < f2/f < 8.0$ | Condition (A) |
| $LVD/\{4\cdot(1-2\cdot\tan\theta)\} < Bf < LVD/(1-2\cdot\tan\theta') + LVD$ | Condition (B) |
| $0.25 < d/f2 < 1.0$ | Condition (C) | wherein
- f2 is the focal length of the second lens group;
- f is the smallest focal length of the combination in optical series of the first lens group and the second lens group;
- LVD is the diagorial dimension of the display element;
- Bf is the back focal length of the combination in optical series of the first lens group and the second lens group at the smallest focal length of the combination of the first lens group and the second lens group;
- θ is the angle for which $\sin\theta = 1/(4\cdot F_{NO})$;
- θ' is the angle for which $\sin\theta' = 1/(2\cdot F_{NO})$;
- $F_{NO}$ is the f-number at the smallest focal length of the combination in optical series of the first lens group and the second lens group; and
- d is the air-converted distance along the optical axis, defined by the combination in optical series of the first lens group and each of the second lens groups, between the first lens group and each of the second lens groups at the smallest focal length of the combination in optical series of the first lens group and the second lens group.

The air-converted distance d above is determined by dividing each portion of the distance being considered by the index of refraction of the material along that portion of an optical axis where the distance is being measured, with air having an index of refraction of unity.

When the upper limit of Condition (A) is not satisfied, the projection lens 30 will be too large. When the lower limit of Condition (A) is not satisfied, the optical powers of the second lens groups G2a and G2b will be too large, making it difficult to have enough space between the second lens groups and the first lens group G1 for an appropriate optical combiner 29. Additionally, when either the upper limit or the lower limit of Condition (A) is not satisfied, it is difficult to properly balance and correct various aberrations.

Condition (B) simply requires that the projection lens 30 of the present invention have a back focal length that leaves adequate space for the light separating structures, PBSs 19 and 26, for separating the illumination light beam from the projection light beam on the reducing side, that is, the side opposite the enlarging side, of the RLCDs 21a, 21b, and 21c. This space required can be reduced when the prisms in the light separating structures have higher refraction indexes. When the lower limit of Condition (B) is not satisfied, a sufficient space will not be obtained. When the upper limit of Condition (B) is not satisfied, the projection lens 30 and, accordingly, the projection display device will be increased in size too much or the optical performance of the projection lens 30 may be deteriorated too much.

Condition (C) assures a sufficient space for the optical combiner between the first lens group G1 and second lens groups G2a and G2b in the projection lens 30 of the present invention. When the lower limit of Condition (C) is not satisfied, a sufficient space will not be obtained. When the upper limit of Condition (C) is not satisfied, the projection lens 30 and, accordingly, the projection display device will be increased in size too much.

In the projection lens 30 of the present invention, the second lens groups G2a and G2b are provided on the reducing side, that is, on the side opposite the enlarging side, of the dichroic prism (optical combiner) 29. This facilitates designing a wide-angle lens as is demanded for the projection lens. Prior art projection display devices in which an entire projection lens is provided after an optical combiner include light combining structures, light separating structures, and other elements between the RLCDs on the reducing side of the entire projection lens that require so much space that it is difficult to produce a sufficiently wide wide-angle lens. The projection display device of the present invention includes projection lens 30 that has fewer elements between the RLCDs 21a to 21c and the reducing side of the entire projection lens 30. This allows the projection lens 30 to have a smaller focal length and facilitates producing a wide-angle lens having nearly the same size as the prior art lens without increasing the size of the projection lens or size of the projection display device. Thus, a wide-angle lens that has excellent optical performance can be designed without using expensive glass materials, which is advantageous in reducing costs.

In some prior art projection display devices, part of the projection lens is provided near the RLCDs instead of the entire projection lens being provided after the optical combiner. For example, Japanese Laid-Open Patent Application 2001-154152 describes the use of a field lens near the RLCDs and this field lens is considered to be part of the projection lens. This technique has an effect of reducing the size of the PBSs and dichroic prisms. However, this technique also prevents obtaining a telecentric relationship that is desirable in terms of illumination and color distribution on a projection screen. It is preferable that the light beams that pass through the PBSs be telecentric light beams. Additionally, when a field lens is provided near the display elements, as in the prior art described above, the polarization state of the white light beam may be disturbed by passing through the field lens. This tends to reduce light usage efficiency and contrast.

The projection lens 30 of the present invention has the second lens groups G2a and G2b after the light separating structures and before the optical combiner. With this structure, the projection lens 30 can have a smaller back focus, as explained above, and the second lens groups G2a and G2b are not too close to the RLCDs 21a, 21b, and 21c, which can eliminate the risk of disturbing the polarization and also improve light usage efficiency and contrast. The second lens groups G2a and G2b of the projection lens 30 of the present invention are telecentric or nearly telecentric on the reducing side, that is, the side opposite the enlarging side. Thus, telecentric light beams pass through the PBSs 19 and 26 that are the light separating structures, improved light usage efficiency is obtained, and uniformity of illumination and the color distribution on a projection screen are improved.

Telecentric light beams are disturbed in the dichroic prism 29. However, the properties of the dichroic coating are adjustable and corrections can be made to a certain extent. Therefore, this is less of a problem compared with where a non-telecentric state occurs within the PBSs.

Embodiments 1–12 of projection display devices of the present invention will be individually described with further reference to the drawings. However, Embodiments 1–9 of the present invention variously describe projection lenses of the present invention that may be used in projection display devices of the present invention described in other of the disclosed Embodiments 1–12 in place of the particular projection lens disclosed in a particular embodiment or as a specific example of a particular projection lens that may be used in another particular embodiment. That is, a projection lens of a particular embodiment of a projection display device of the present invention may be readily applicable to other disclosed embodiments of projection display devices of the present invention, as will be apparent to those skilled in the art.

Additionally, before considering Embodiments 1–12 individually, the terms "lens element", "lens component", and "lens group", as used herein, and the notation used with these terms will be explained with reference to FIG. 2 that shows an enlarged cross-sectional view of a projection lens portion of the projection display device of FIG. 1 (Embodiment 1). In the projection lens portion shown in FIG. 2, lens elements are referenced by the letter L followed by a number denoting their order from the enlarging side of the projection lens along the optical axis X, from L1 to L14. Similarly, radii of curvature of the surfaces of the various optical elements, including the lens surfaces, are referenced by the letter R followed by a number denoting their order from the enlarging side of the projection lens, from R1 to R 33. The on-axis surface spacings along the optical axis X of the various optical surfaces are referenced by the letter D followed by a number denoting their order from the enlarging side of the projection lens, from D1 to D32. In the same manner, the two lens groups are labeled G1 and G2a in order from the enlarging side of the projection lens and the lens components belonging to each lens group are indicated by the brackets adjacent the labels G1 and G2a.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the projection lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as (1) an assembly of one or more lens components in optical series along an optical axis and without any intervening lens component or optical combiner or (2) an assembly of one or more lens components in optical series and with no intervening lens components along an optical axis that, during zooming of a projection lens that includes zooming, is movable as a single unit relative to another lens component or other lens components. An optical combiner is herein defined as an optical element that is designed to combine light beams from different directions into a single light beam directed in a single direction. An assembly of lens components may form two lens groups based on an optical combiner intervening between some of the lens components under definition (1) above at the same time that one or both of the two lens groups further forms a plurality of lens groups, effectively forming subgroups of a larger lens group, under definition (2) above based on lens components of one of the two lens groups being movable as a single unit relative to another lens component or other lens components of the one of the two lens groups. Definition (2) of a "lens group" will be used later particularly with regard to descriptions of Embodiments 2 and 9 of the present invention.

Additionally, the projection lenses of the projection display devices of the present invention may include aspheric surfaces. The lens surfaces that are aspheric are defined using the following equation:

$$Z = (Y^2/R)/[1 + \{1 - K \cdot Y^2/R^2\}^{1/2}] + \Sigma(A_i \cdot Y^{2i}) \quad \text{Equation (A)}$$

where
- Z is the length (in mm) of a line drawn from a point on the aspheric lens surface at a distance Y from the optical axis to the tangential plane of the aspheric surface vertex,
- R is the radius of curvature (in mm) of the aspheric lens surface on the optical axis,
- Y is the distance (in mm) from the optical axis,
- K is the eccentricity, and
- $A_i$ is the ith aspheric coefficient and the summation extends over i.

In embodiments of the invention disclosed below that include aspheric surfaces, only aspheric coefficients $A_2$, $A_3$, $A_4$, and $A_5$ are non-zero.

Embodiments 1–12 of the present invention will now be individually described with further reference to the drawings.

Embodiment 1

Figure 2:
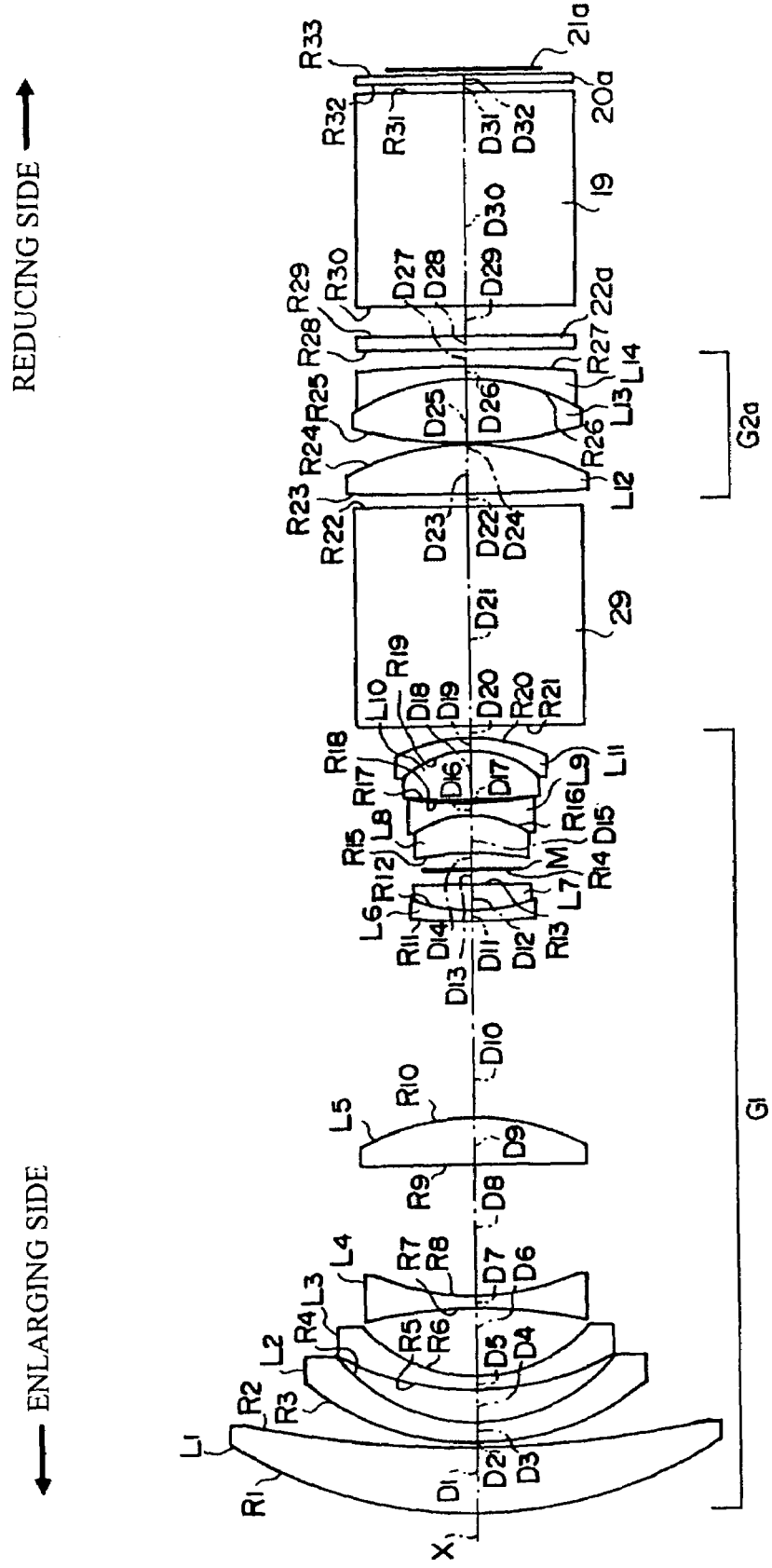
FIG. 2 shows an enlarged cross-sectional view of a projection lens portion of the projection display device of FIG. 1.

FIG. 2 shows an enlarged cross-sectional view of a projection lens portion of the projection display device of Embodiment 1. As shown in FIG. 2, a second lens group G2a and an RLCD 21 a corresponding to it are shown as representative of the multiple second lens groups G2a and G2b and the multiple RLCDs 21a, 21b, and 21c. Nearly the same structure is provided for the other RLCDs 21b and 21c. A second lens group G2b has the same structure as the second lens group G2a. FIG. 1 shows a projection display device using the projection lens shown in FIG. 2.

Figure 11:
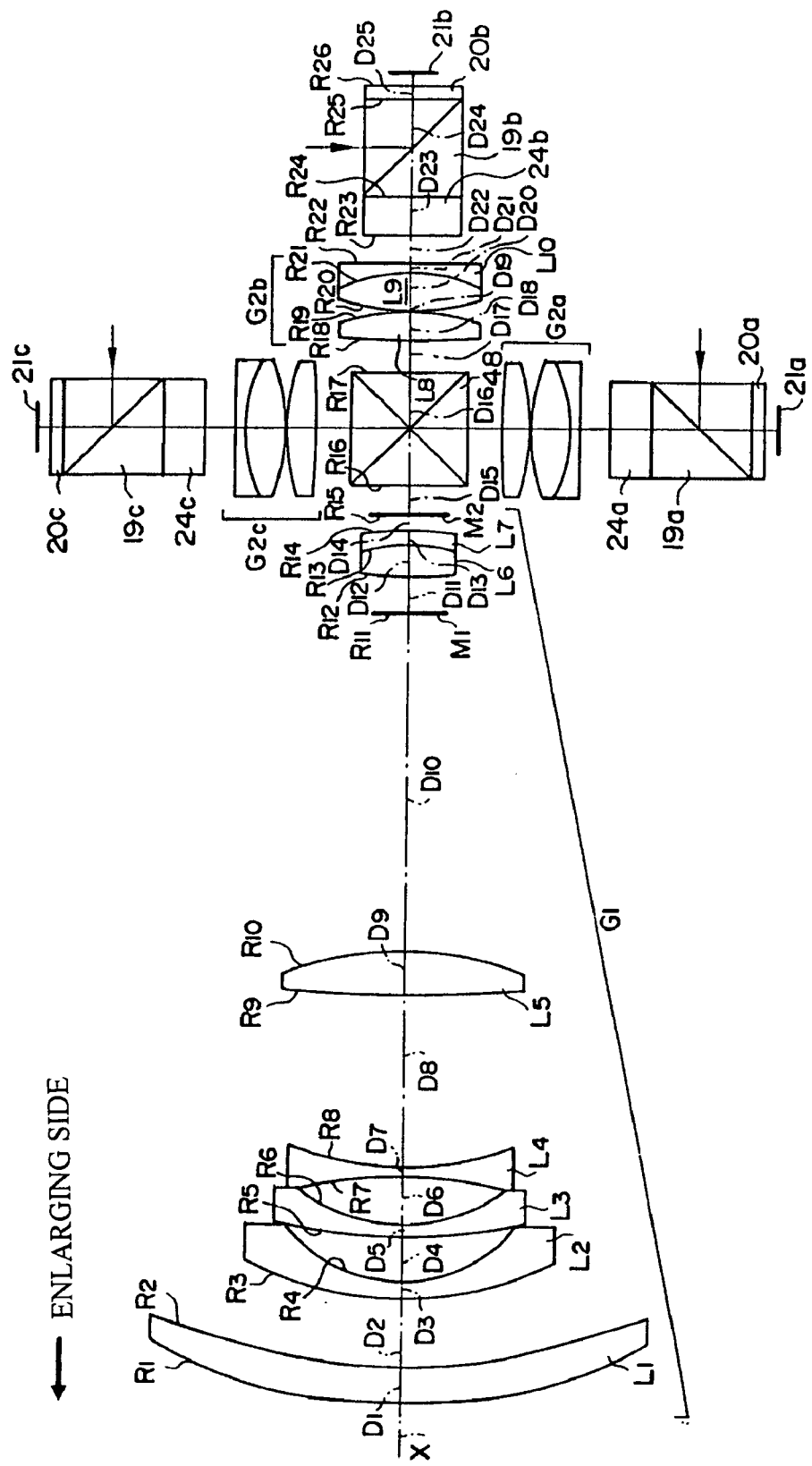
FIG. 11 shows a cross-sectional view of a projection display device according to Embodiment 6.

As shown in FIGS. 1 and 2, the projection lens 30 includes, from the enlarging side, a first lens group G1 having positive refractive power and consisting of a first lens element L1, a second lens element L2, and so forth, up to and including an eleventh lens element L11, a dichroic prism 29 as the optical combiner, and multiple second lens groups G2a and G2b (not shown), each having positive refractive power, with the second lens group G2a being shown as representative and consisting of a twelfth lens element L12, a thirteenth lens element L13, and a fourteenth lens element L14. The first color light beam enters the dichroic prism 29 via the second lens group G2a and the second and third color light beams enter it via the second lens groups G2b from two different directions. They are then combined and projected via the first lens group G1. The projection lens 30 includes a mask M (which may be replaced by plural masks such as M1 and M2 as shown in FIG. 11 with regard to Embodiment 6) positioned for limiting the light transmitted by the projection lens 30. The position of the mask or the positions of the masks are based on a desired diaphragm position for stopping ambient light or projected light in order to control the f-number of the projection lens based on a particular lens design.

Table 1 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 1. The values in Table 1 are based on a normalized focal length of 1 mm (i.e., with the projection lens focused at infinity), which may relate, for example, to the wide-angle focal length of a zoom lens. For Embodiment 1, the diagonal dimension LVD of the display elements (RLCDs) is 1.39 mm and the f-number $F_{NO}$ of the projection lens of Embodiment 1 based on Table 1 is 2.80.

TABLE 1

| # | R | D | $N_d$ | $v_d$ |
|---|---|---|---|---|
| 1 | 3.8723 | 0.5963 | 1.80400 | 46.6 |
| 2 | 9.6811 | 0.0394 | | |
| 3 | 2.3002 | 0.1758 | 1.72916 | 54.7 |
| 4 | 1.5500 | 0.3041 | | |
| 5 | 2.5032 | 0.1311 | 1.71300 | 53.9 |
| 6 | 1.3432 | 0.5984 | | |
| 7 | −4.1310 | 0.1102 | 1.84666 | 23.8 |
| 8 | 2.2292 | 1.1657 | | |
| 9 | −68.8553 | 0.4177 | 1.51823 | 58.9 |
| 10 | −2.0708 | 1.7894 | | |
| 11 | 4.9811 | 0.1013 | 1.81600 | 46.6 |
| 12 | 1.3893 | 0.2419 | 1.84666 | 23.8 |

TABLE 1-continued

| # | R | D | $N_d$ | $v_d$ |
|---|---|---|---|---|
| 13 | −11.8725 | 0.1268 | | |
| 14 | ∞ (mask) | 0.1506 | | |
| 15 | −2.6658 | 0.3546 | 1.84666 | 23.8 |
| 16 | −0.8822 | 0.1013 | 1.74000 | 28.3 |
| 17 | 3.4543 | 0.0266 | | |
| 18 | 5.9538 | 0.4559 | 1.51633 | 64.1 |
| 19 | −0.8721 | 0.1013 | 1.84666 | 23.8 |
| 20 | −1.5168 | 0.1162 | | |
| 21 | ∞ | 2.0137 | 1.51633 | 64.1 |
| 22 | ∞ | 0.1162 | | |
| 23 | 27.4024 | 0.4334 | 1.60300 | 65.4 |
| 24 | −2.2591 | 0.0156 | | |
| 25 | 3.4275 | 0.5825 | 1.49700 | 81.5 |
| 26 | −1.9512 | 0.1102 | 1.84666 | 23.8 |
| 27 | −10.7451 | 0.2546 | | |
| 28 | ∞ | 0.1624 | 1.51633 | 64.1 |
| 29 | ∞ | 0.1000 | | |
| 30 | ∞ | 1.9362 | 1.49700 | 81.5 |
| 31 | ∞ | 0.1500 | | |
| 32 | ∞ | 0.0700 | 1.51633 | 64.1 |
| 33 | ∞ | | | |

The projection display device of Embodiment 1 satisfies Conditions (A)–(C) above, as set forth in Table 2 below.

TABLE 2

| Condition | Condition Inequality | Value |
|---|---|---|
| (A) | $1.0 < f2/f < 8.0$ | 2.88 |
| (B) | $LVD/\{4 \cdot (1 - 2 \cdot \tan \theta)\} < Bf < LVD/(1 - 2 \cdot \tan \theta') + LVD$ | 1.95 |
| (C) | $0.25 < d/f2 < 1.0$ | 0.54 |

FIGS. 14A–14D show the spherical aberration, astigmatism, distortion, and the lateral color, respectively, of the projection lens according to Embodiment 1 with the distance to the enlarging side imaging point (the screen position) from the lens surface on the reducing end of the projection lens being 139.5 mm. In FIG. 14A, the spherical aberration is shown for the d-line ($\lambda$=587.6 nm), the F-line ($\lambda$=486.1 nm), and the C-line ($\lambda$=656.3 nm). As shown in FIG. 14A, the f-number is 2.80. In FIG. 14B, the astigmatism is shown at the d-line ($\lambda$=587.6 nm) for both the sagittal image surface S and the tangential image surface T. In FIG. 14C, the distortion is shown at the d-line ($\lambda$=587.6 nm). The half-field angle ω for FIGS. 14B–14D is 34.8°. FIG. 14D shows the lateral color at the F-line ($\lambda$=486.1 nm) and the C-line ($\lambda$=656.3 nm) relative to the d-line ($\lambda$=587.6 nm). As is apparent from these figures, the various aberrations are favorably corrected.

Hence, this projection display device achieves excellent optical performance with a compact design and makes production at low cost possible with a suitable wide-angle projection lens.

The structure of the projection display device of Embodiment 1 will now be further described with further reference to FIG. 1. The light source section includes a light source lamp 10 at the focal point of a parabolic reflector 11. The light source lamp 10 can be an ultra-high-pressure mercury lamp or an extremely bright white light source such as a metal halide lamp. White light emitted from the light source lamp 10 is reflected by the parabolic reflector 11 in one direction and the collimated light beam is projected parallel or nearly parallel to the optical axis of the parabolic reflector 11 to enter an integrator optical system.

The integrator optical system includes first and second lens arrays 12 and 13, each of which includes multiple convex lenses arranged in a rectangular shape on a substrate. The surfaces of the convex lenses of the first lens array 12 are aligned with corresponding surfaces of the convex lenses of the second lens array 13, whereby light beams from the light source efficiently and uniformly illuminate the effective apertures of RLCDs 21a, 21b, and 21c provided at later stages of the projection display device. Light entering the first lens array 12 forms the same number of images of the light source as the number of convex lenses in a plane orthogonal to the optical axis by means of the light collecting action of the convex lenses. The second lens array 13 is positioned near these light source images. The light collected by the convex lenses of the second lens array 13 enters a polarization conversion optical system 14 adjacent to the second lens array 13.

The polarization conversion optical system 14 is a polarization direction conversion system for converting white light emitted from the light source lamp 10 to linearly polarized light. Compared with using a polarizing plate as a polarization direction conversion system, the polarization conversion optical system 14 divides the light beam made uniform in cross-sectional light intensity by the integrator optical system into P and S polarized light beams of about equal intensity so that they are projected as collimated or nearly collimated light beams. This helps achieve efficient use of the available light. With the P polarized light being converted to S polarized light, the light beams from the light source are guided to the RLCDs 21a, 21b, and 21c at later stages of the projection display device without wasting light from the light source because of different polarization states at different stages.

The light beams emerging from the polarization conversion optical system 14 are further collected by condenser lenses 15, 17a, and 17b, each consisting of at least one lens element and each having positive refractive power, and light beams of three different colors are produced and directed to illuminate RLCDs 21a, 21b, and 21c, each of which corresponds to one of the three different colors. A dichroic mirror 16 has a dichroic coating on a glass substrate. The dichroic coating consists of a dielectric multilayer coating having a spectral property that transmits the first color light beam. With the other primary color light beams entering at an incident angle of 45 degrees, the first color light is transmitted and the second and third color lights are reflected at a right angle. The first color light beam transmitted through the dichroic mirror 16 enters the PBS 19, which is a light separating structure. The S polarized first light beam is reflected by the polarization sensitive beam splitting coating therein to the RLCD 21a for modulating the first color light beam with image information. A quarter-wavelength plate 20a is provided before the RLCD 21a in order to improve the contrast of a projected image.

The second and third color light beams are reflected by the dichroic mirror 16 and enter the PBS 26, which is a light separating structure. A wavelength specific polarization conversion element 25 is provided on the reducing side of the PBS 26, where one of the lights, for example, the blue light, is rotated by a certain angle to convert it to P polarized light. Then, the second color light beam is transmitted through the PBS 26 to illuminate the RLCD 21b for modulating the second color light beam with image information. The third color light beam, which is S polarized, is reflected within the PBS 26 to illuminate the RLCD 21c for modulating the third color light beam with image information. Quarter-wavelength plates 20b and 20c are provided on the reducing side of the RLCDs 21b and 21c, respectively, in order to improve the contrast of a projected image.

The light beams reflected by the RLCDs 21a, 21b, and 21c and modulated with the respective color light image information return to the PBS 19 or 26. However, they are linearly polarized in the opposite directions to when they previously were emitted from the PBSs 19 and 26. Therefore, the first color light beam is transmitted through the PBS 19 and exits to the dichroic prism 29, which is the optical combiner for combining the modulated light beams of different colors. The second and third color light beams (the former being reflected within the PBS 26 and the latter being transmitted through the PBS 26) are combined in the PBS 26 and exit to the dichroic prism 29. The dichroic prism 29, as the optical combiner, is a glass prism containing a dichroic coating consisting of a dielectric multilayer coating having a spectral property with which the first color light beam is transmitted and the other primary colors entering at an incident angle of 45 degrees are reflected. Thus, the three color light beams are combined and exit to the first lens group G1. In this way, the projection lens 30 combines the light beams from the RLCDs 21b and 21c at the reducing side of the second lens group G2b.

Polarizing plates 18a and 22a are provided on the entrance side (light source side) and the exit side (projection lens side) of the PBS 19, respectively, to adjust shifts of the polarization direction of incident light beams. Wavelength specific polarization conversion elements 25 and. 27 are provided on the entrance side (light source side) and the exit side (projection lens side) of the PBS 26, respectively, in order to convert the polarization of the second color light beam to the P polarization. Polarizing plates 18b and 22b are provided on the entrance side (light source side) and exit side (projection lens side), respectively, of the elements 25 and 27, respectively, so as to adjust shifts in the polarization direction of light beams. Particularly, the polarizing plates 18 a and 18b adjust shifts of the polarization that occur when the light beam passes through the dichroic mirror 16, preventing deterioration in the efficient use of the light and deterioration in contrast of a projected image.

Using a projection display device of Embodiment 1, including the projection lens of Embodiment 1 described above, enables achieving a compact efficient projection display device as shown in FIG. 1.

Embodiment 2

Figure 3:
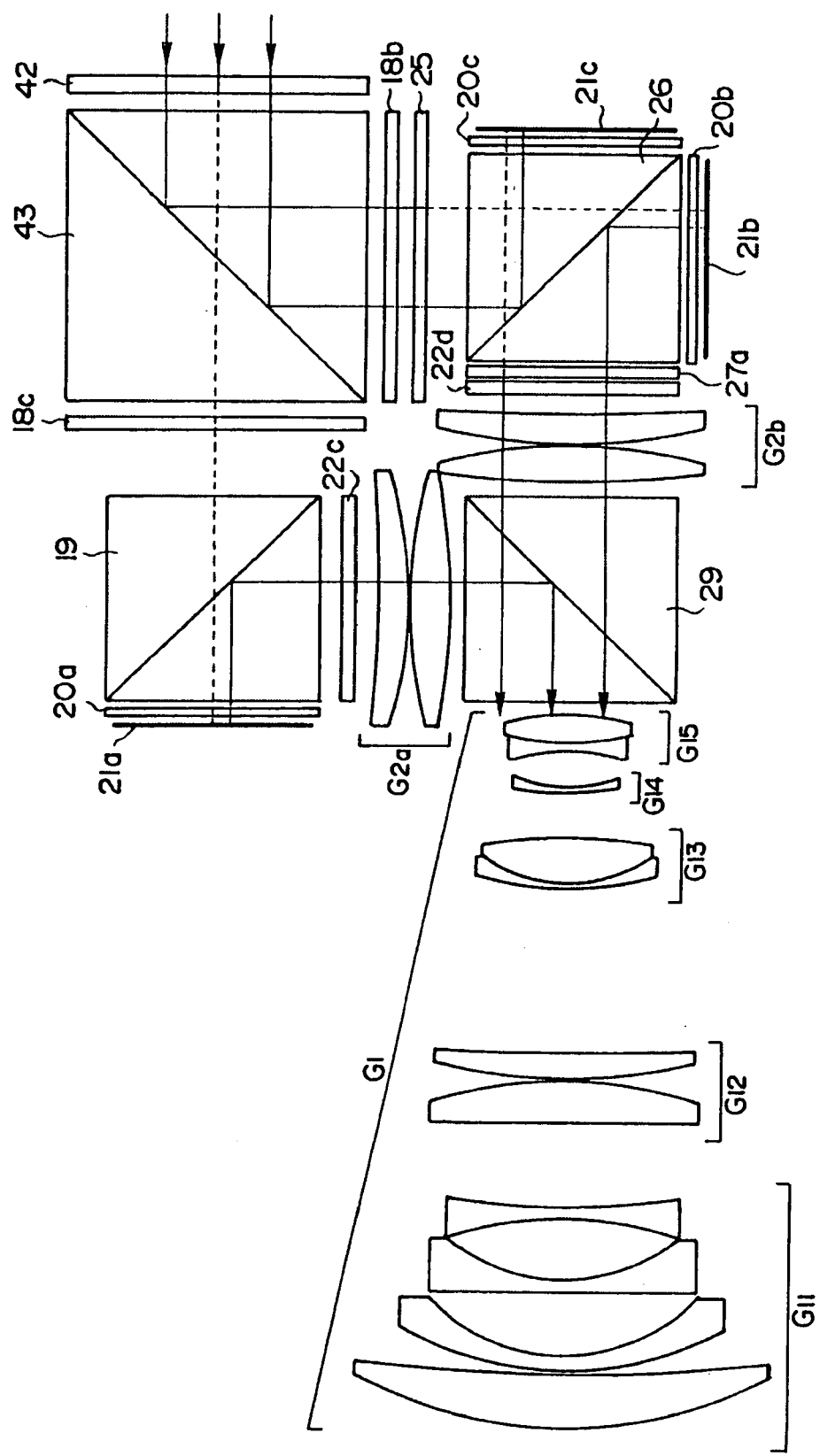
FIG. 3 shows a plan view of a projection display device according to Embodiment 2.
Figure 4:
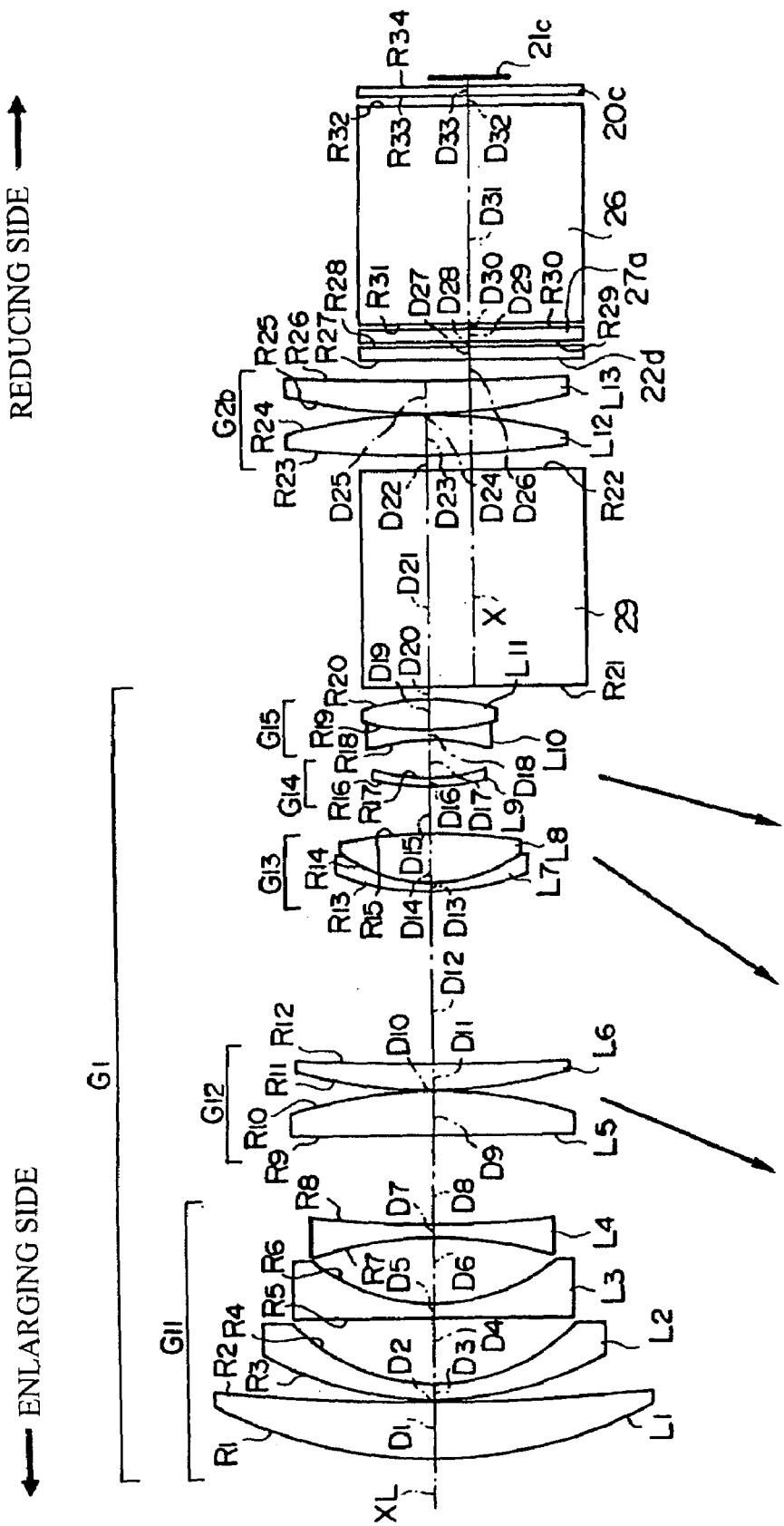
FIG. 4 shows a more detailed side view of a projection lens portion of the projection display device of FIG. 3.

FIG. 3 shows a plan view of a projection display device according to Embodiment 2, and FIG. 4 shows a more detailed side view of a projection lens portion of the projection display device of FIG. 3. FIG. 4 clearly shows the structure of the projection lens, in which a second lens group G2b and an RLCD 21c corresponding to it are shown as representative in the same manner as FIG. 2 shows representative structures for Embodiment 1. The second lens groups G2a and G2b have the same function. In FIGS. 3 and 4, elements having the same functions as in Embodiment 1 are given the same reference numbers as those used in FIGS. 1 and 2, and further explanations of these elements and functions are therefore omitted.

The projection display device of Embodiment 2 is different from Embodiment 1 in that it uses a zoom projection lens. The first lens group G1 of this projection lens includes, from the enlarging side, a first lens element L1, a second lens element L2, and so forth up to and including an eleventh lens element L11, that form, from the enlarging side, a lens group G11 that is fixed during zooming and is moved for focusing, lens groups G12, G13, and G14 that are relatively movable for continuous zooming and correction of image plane shift caused by the continuous zooming, and a lens group G15 that is fixed during zooming. Each of the second lens groups G2a and G2b includes a twelfth lens element L12 and a thirteenth lens element L13. The distance along the optical axis between lens components within each of the second lens groups G2a and G2b remains constant during zooming and focusing, as do the distances along the optical axis between the first lens group G1 and the second lens groups G2a and G2b, by keeping the distances between lens group G15 and lens groups G2a and G2b fixed during zooming and focusing. FIGS. 3 and 4 show the lens geometry of the projection lens at the wide-angle end and the three downwardly directed arrows indicate generally the direction of movement of the three lens groups G12, G13, and G14 along the optical axis XL during zooming from the wide-angle end to the telephoto end.

The projection lens of Embodiment 2 is efficient as a zoom lens, as well as a fixed focal length lens at any position in the zoom range. Particularly, a projection zoom lens, which is a wide-angle lens, is generally provided with lens elements having larger diameters on the enlarging side. Therefore, it is preferred that the first lens group G1 has a lens group within it on the enlarging end that is fixed during zooming and has negative refractive power, as is true of lens group G11 of Embodiment 2.

Table 3 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 2. The numerical values of R and D in Table 3 are based on a normalized focal length of 1 mm at the wide-angle end of the zoom lens of Embodiment 2 (i.e., with the zoom lens focused at infinity). For Embodiment 2, the diagonal dimension LVD of the display elements (RLCDs) is 0.69 mm and the f-number $F_{NO}$ of the projection lens of Embodiment 2 based on Table 3 is 2.47.

TABLE 3

| # | R | D | $N_d$ | $v_d$ |
|---|---|---|---|---|
| 1 | 2.0525 | 0.2800 | 1.72916 | 54.7 |
| 2 | 9.4576 | 0.0086 | | |
| 3 | 1.5702 | 0.0772 | 1.58913 | 61.1 |
| 4 | 0.9039 | 0.3191 | | |
| 5 | −26.2322 | 0.0656 | 1.71736 | 29.5 |
| 6 | 0.8764 | 0.3092 | | |
| 7 | −1.7652 | 0.0618 | 1.49700 | 81.5 |
| 8 | 3.9824 | D8 (variable) | | |
| 9 | 20.7288 | 0.2170 | 1.84666 | 23.8 |
| 10 | −2.2248 | 0.0084 | | |
| 11 | 2.3436 | 0.1351 | 1.84666 | 23.8 |
| 12 | 10.9024 | D12 (variable) | | |
| 13 | 1.3107 | 0.0367 | 1.84666 | 23.8 |
| 14 | 0.7301 | 0.2353 | 1.61772 | 49.8 |
| 15 | −2.3714 | D15 (variable) | | |
| 16 | 1.3065 | 0.0367 | 1.84666 | 23.8 |
| 17 | 0.8124 | D17 (variable) | | |
| 18 | −0.8178 | 0.0444 | 1.84666 | 23.8 |
| 19 | 1.3456 | 0.1463 | 1.71300 | 53.9 |
| 20 | −1.0237 | 0.0633 | | |
| 21 | ∞ | 1.0557 | 1.51633 | 64.1 |
| 22 | ∞ | 0.0633 | | |
| 23 | 4.0684 | 0.1959 | 1.80100 | 35.0 |
| 24 | −2.6913 | 0.0084 | | |
| 25 | 2.4213 | 0.1605 | 1.84666 | 23.8 |
| 26 | 10.1662 | 0.1301 | | |
| 27 | ∞ | 0.0450 | 1.51633 | 64.1 |

TABLE 3-continued

| # | R | D | $N_d$ | $v_d$ |
|---|---|---|---|---|
| 28 | ∞ | 0.0150 | | |
| 29 | ∞ | 0.0450 | 1.51633 | 64.1 |
| 30 | ∞ | 0.0500 | | |
| 31 | ∞ | 1.0557 | 1.49700 | 81.5 |
| 32 | ∞ | 0.0800 | | |
| 33 | ∞ | 0.0367 | 1.51633 | 64.1 |
| 34 | ∞ | | | |

Table 4 below lists the values of the variables D8, D12, D15, and D17 (i.e., the group spacings) at the wide-angle and telephoto settings of the zoom lens of Embodiment 2.

TABLE 4

| Setting | D8 | D12 | D15 | D17 |
|---|---|---|---|---|
| Wide-angle | 0.4155 | 0.8364 | 0.2222 | 0.1912 |
| Telephoto | 0.2640 | 0.7048 | 0.4140 | 0.2825 |

The projection display device of Embodiment 2 satisfies Conditions (A)–(C) above, as set forth in Table 5 below.

TABLE 5

| Condition | Condition Inequality | Value |
|---|---|---|
| (A) | $1.0 < f2/f < 8.0$ | 1.33 |
| (B) | $LVD/\{4 \cdot (1 - 2 \cdot \tan \theta)\} < Bf < LVD/(1 - 2 \cdot \tan \theta') + LVD$ | 1.06 |
| (C) | $0.25 < d/f2 < 1.0$ | 0.62 |

FIGS. 15A–15D show the spherical aberration, astigmatism, distortion, and lateral color, respectively, of the zoom projection lens of Embodiment 2 at the wide-angle end. FIGS. 16A–16D show the spherical aberration, astigmatism, distortion, and lateral color, respectively, of the zoom projection lens of Embodiment 2 at the telephoto end. In both cases, the distance to the enlarging side imaging point (the screen position) from the lens surface on the reducing end of the projection lens is 98.2 mm. In FIGS. 15A and 16A, the spherical aberration is shown for the d-line ($\lambda$=587.6 nm), the F-line ($\lambda$=486.1 nm), and the C-line ($\lambda$=656.3 nm). In the remaining figures, ω is the half-field angle (ω=26.6° at the wide-angle end and ω=22.4° at the telephoto end). In FIGS. 15B and 16B, the astigmatism is shown for the sagittal image surface S and the tangential image surface T. In FIGS. 15C and 16C, distortion is measured at 587.6 nm (the d-line). In FIGS. 15D and 16D, the lateral color is shown for the F-line ($\lambda$=486.1 nm) and the C-line ($\lambda$=656.3 nm) relative to the d-line ($\lambda$=587.6 nm). As is apparent from these figures, the various aberrations are favorably corrected over the entire range of zoom.

Using a projection display device of Embodiment 2, including the projection lens of Embodiment 2 described, enables a compact efficient projection display device as shown in FIG. 3.

When a projection display device of the present invention includes a zoom projection lens as in Embodiment 2, the distances of lens elements within each of the multiple second lens groups G2a and G2b along the optical axis remain fixed and, among the distances between the lens elements within the first lens group and the distances between the first lens group and the second lens groups G2a, G2b along the optical axis, at least two of them can be variable for changing the focal length of the entire lens system. For example, instead of the zooming arrangement of Embodiment 2, a zoom lens may be constituted so that at least one of the lens gaps within the first lens group and the distances between the first lens group and second lens groups G2a, G2b is variable in order to perform zooming.

The structure of the projection display device of Embodiment 2 will now be further described with further reference to FIG. 3. The light source section, integrator optical system, and polarization conversion optical system are not shown in FIG. 3 because these structures may be the same or equivalent to those described previously with regard to Embodiment 1. As shown in FIG. 3, the projection display device of Embodiment 2 provides color separation with a wavelength specific polarization conversion element 42 for converting the S polarized first color light beam to a P polarized light beam and a PBS 43 for separating incident light depending on the polarization direction. Polarizing plates 18c and 18b are provided between the PBS 43 and PBSs 19 and 26, respectively, to adjust shifts in the polarization direction of the light beams. A wavelength specific polarization conversion element 27a for converting the P polarized third color light beam to an S polarized light beam is provided on the exit side (projection lens side) of the PBS 26, which is followed by a polarizing plate 22d that transmits S polarized light. A polarizing plate 22c also transmits S polarized light. Therefore, all the light beams combined by and emerging from the dichroic prism 29 are S polarized.

As shown in FIG. 4, the optical axis XL of the projection lens is shifted in relation to the optical axis X of the RLCD 21c through the dichroic prism 29. In this projection display device, the first lens group G1 and the second lens groups G2a and G2b, which form the projection lens, are movable together in a direction orthogonal to the optical axis. This is for complying with the general use of the projection display device wherein upward projection is often used.

Using a projection display device of Embodiment 2, including the projection lens of Embodiment 2 described above, enables achieving a compact efficient projection display device as shown in FIG. 3.

Embodiment 3

Figure 5A:
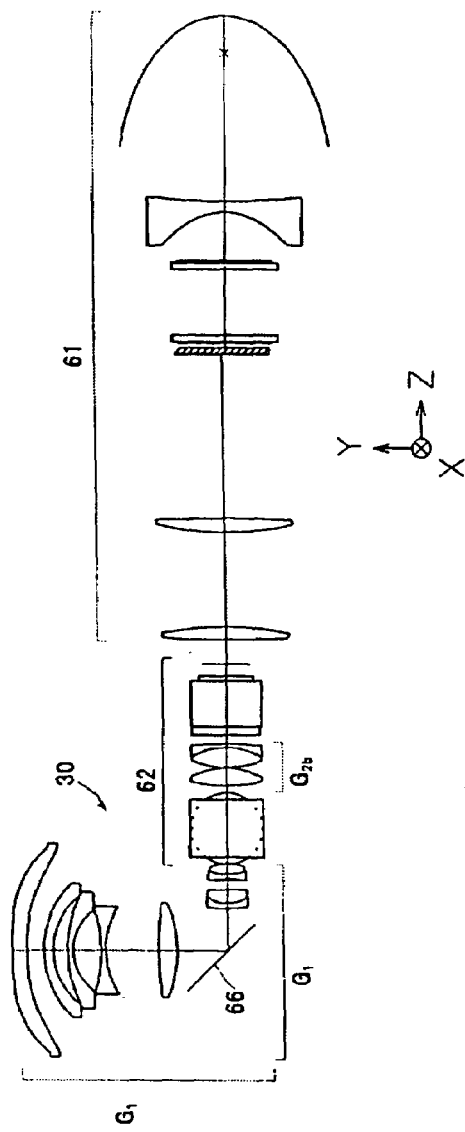
FIGS. 5A–5B show cross-sectional views of a projection display device according to Embodiment 3.
Figure 5B:
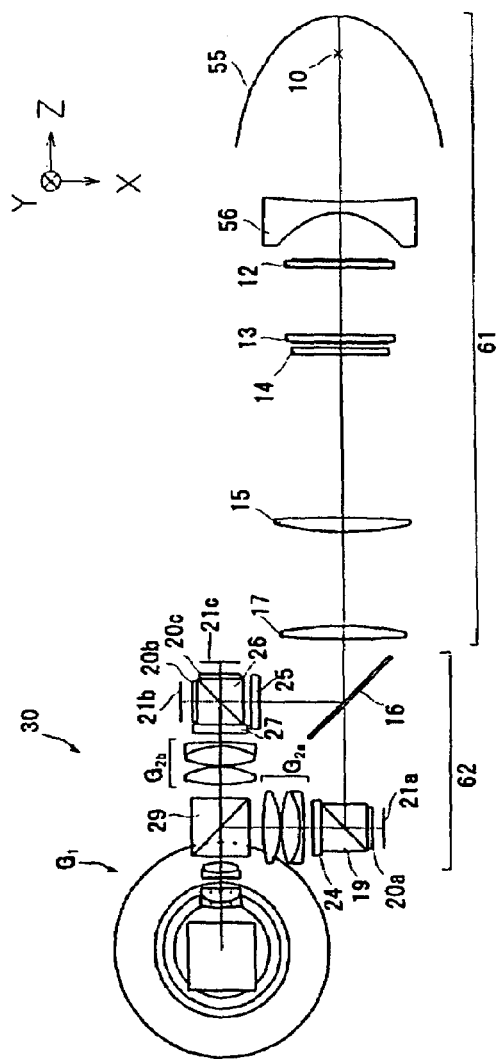
Figure 6:
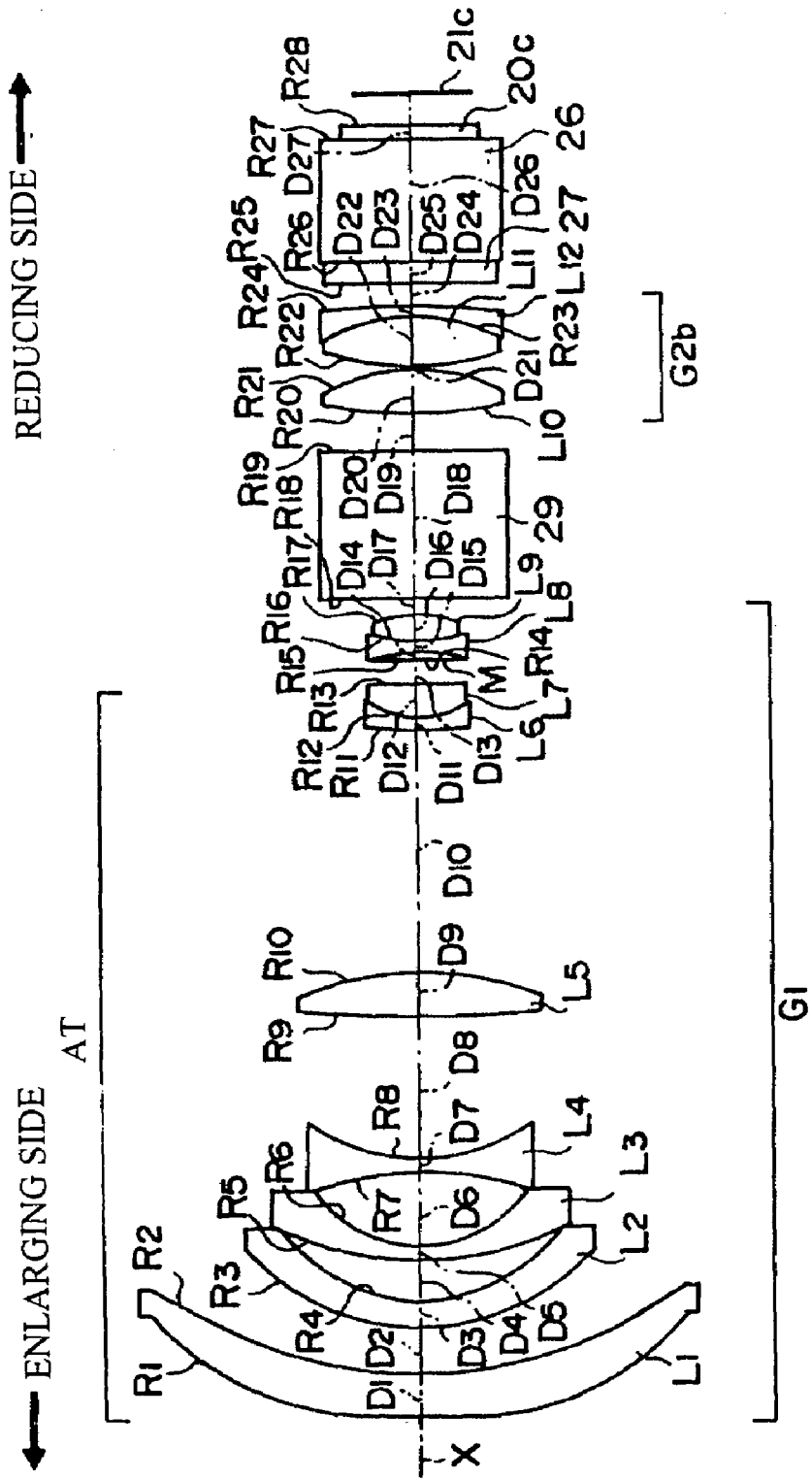
FIG. 6 shows an enlarged cross-sectional view of a projection lens portion of the projection display device of FIGS. 5A–5B.
Figure 7:
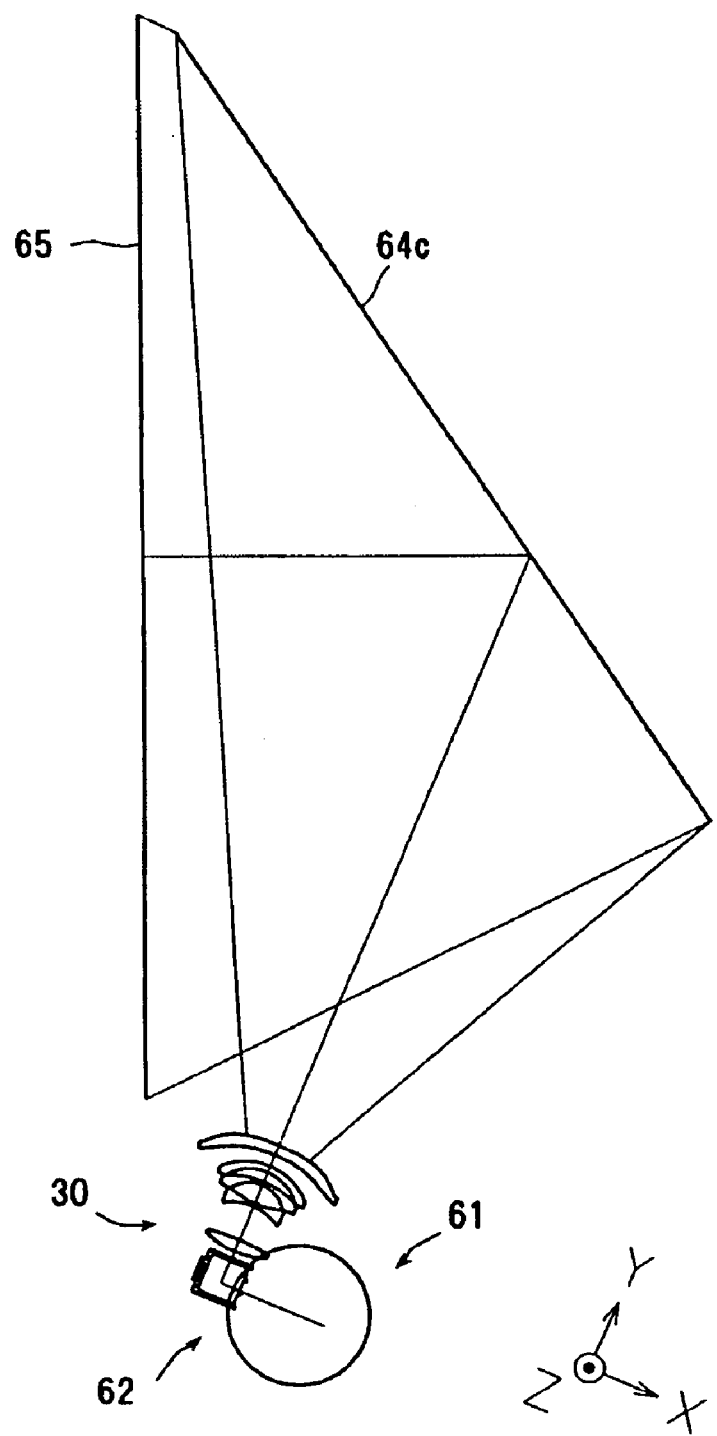
FIG. 7 shows a cross-sectional view of a rear projection television that includes a projection display device according to Embodiment 3.

FIGS. 5A–5B show cross-sectional views of a projection display device according to Embodiment 3. FIG. 6 shows an enlarged cross-sectional view of a projection lens portion of the projection display device of FIGS. 5A–5B. FIG. 7 shows a cross-sectional view of a rear projection television that includes a projection display device according to Embodiment 3. FIGS. 5A–5B show an illumination optical system 61 as well as a projection lens 30. For simplicity of illustration, FIG. 6 omits the total reflection mirror 66 and the folding of the optical path by the total reflection mirror 66 that is shown in FIGS. 5A–5B. FIG. 7 shows the illumination optical system 61, the projection lens 30 and a screen 65. For Embodiment 3, FIG. 6, similar to FIG. 2 for Embodiment 1, shows a second lens group G2b and a RLCD 21c that are representative of the multiple second lens groups G2a and G2b, which have the same structure, and the multiple RLCDs 21a, 21b, and 21c.

The projection lens 30 of Embodiment 3 has nearly the same structure as in Embodiment 1. However, as shown in FIG. 6, the first lens group G1 includes a first lens element L1, a second lens element L2, and so forth only up to and including a ninth lens element L9 and each of the second lens groups G2a and G2b includes a tenth lens element L10, an eleventh lens element L11, and a twelfth lens element L12. Both surfaces of the first lens element L1 of this projection lens 30 are aspheric, and the shapes of the aspheric surfaces are expressed by Equation (A) above.

Table 6 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 3. The values in Table 6 are based on a normalized focal length of 1 mm (i.e., with the projection lens focused at infinity). For Embodiment 3, the diagonal dimension LVD of the display elements (RLCDs) is 1.02 mm and the f-number $F_{NO}$ of the projection lens of Embodiment 3 based on Table 6 is 2.80.

TABLE 6

| # | R | D | $N_d$ | $v_d$ |
|---|---|---|---|---|
| 1* | 27.7289 | 0.6248 | 1.50842 | 56.4 |
| 2* | 10.0817 | 0.7407 | | |
| 3 | 3.9403 | 0.3976 | 1.62041 | 60.3 |
| 4 | 2.8834 | 0.6188 | | |
| 5 | 5.2242 | 0.2272 | 1.49700 | 81.6 |
| 6 | 2.0963 | 1.1967 | | |
| 7 | −5.2132 | 0.1931 | 1.84665 | 23.8 |
| 8 | 3.4029 | 2.2051 | | |
| 9 | 14.4767 | 0.7782 | 1.78800 | 47.4 |
| 10 | −5.1647 | 3.8624 | | |
| 11 | 5.1814 | 0.2193 | 1.71300 | 53.9 |
| 12 | 1.3869 | 0.5816 | 1.80517 | 25.4 |
| 13 | −57.8476 | 0.3953 | | |
| 14 | ∞ (mask) | 0.0867 | | |
| 15 | −3.0113 | 0.1704 | 1.84665 | 23.8 |
| 16 | 2.2499 | 0.4430 | 1.48749 | 70.2 |
| 17 | −2.0307 | 0.2272 | | |
| 18 | ∞ | 2.4090 | 1.51633 | 64.1 |
| 19 | ∞ | 0.5680 | | |
| 20 | 6.6275 | 0.7191 | 1.48749 | 70.2 |
| 21 | −3.1761 | 0.0329 | | |
| 22 | 4.2414 | 0.8156 | 1.49700 | 81.6 |
| 23 | −2.8990 | 0.1590 | 1.84665 | 23.8 |
| 24 | −12.8710 | 0.5794 | | |
| 25 | ∞ | 0.5261 | 1.51633 | 64.1 |
| 26 | ∞ | 1.9312 | 1.84138 | 24.6 |
| 27 | ∞ | 0.3000 | 1.51633 | 64.1 |
| 28 | ∞ | | | |

The surfaces with a * to the right of the surface number in Table 6 are aspheric lens surfaces, and the aspheric surface shapes are expressed by Equation (A) above.

Table 7 below lists the values of the constant K and the aspheric coefficients $A_2$–$A_5$ used in Equation (A) above for each of the aspheric lens surfaces of Table 6. Aspheric coefficients that are not present in Table 7 are zero. An "E" in the data indicates that the number following the "E" is the exponent to the base 10. For example, "1.0E-2" represents the number $10 \times 10^{-2}$.

TABLE 7

| # | K | $A_2$ | $A_3$ | $A_4$ | $A_5$ |
|---|---|---|---|---|---|
| 1 | 1.3687 | 5.0207E−3 | −1.6809E−4 | 7.2825E−6 | −1.4014E−7 |
| 2 | 1.2666 | 3.1183E−3 | 2.7707E−5 | −1.4534E−5 | 3.7898E−7 |

The projection display device of Embodiment 3 satisfies Conditions (A)–(C) above, as set forth in Table 8 below.

TABLE 8

| Condition | Condition Inequality | Value |
|---|---|---|
| (A) | 1.0 < f2/f < 8.0 | 3.45 |
| (B) | LVD/{4 · (1 − 2 · tan θ)} < Bf < LVD/(1 − 2 · tan θ') + LVD | 2.18 |
| (C) | 0.25 < d/f2 < 1.0 | 0.69 |

Figures 17A, 17B, 17C, 17D:
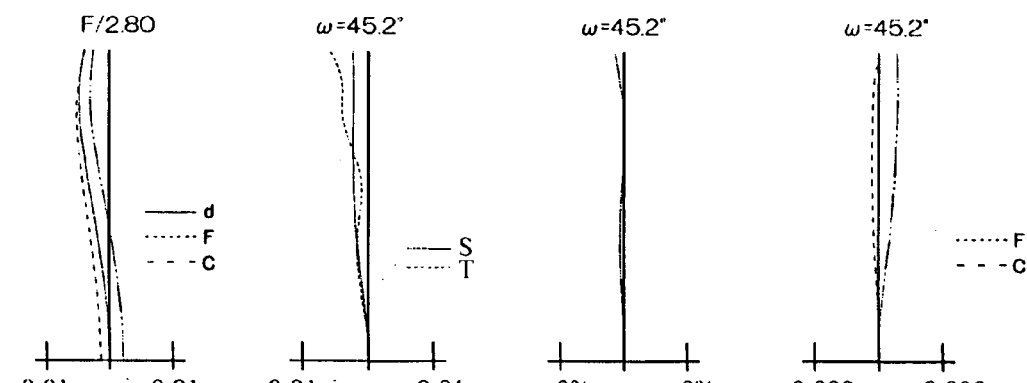
FIGS. 17A–17D show the spherical aberration, astigmatism, distortion, and lateral color, respectively, of the projection lens according to Embodiment 3.

FIGS. 17A–17D show the spherical aberration, astigmatism, distortion, and lateral color, respectively, of the projection lens according to Embodiment 3 with the distance to the enlarging side imaging point (the screen position) from the lens surface on the reducing end of the projection lens being 79.5 mm. In FIG. 17A, the spherical aberration is shown for the d-line (λ=587.6 nm), the F-line (λ=4.86 nm), and the C-line (λ=656.3 nm). As shown in FIG. 17A, the f-number is 2.80. In FIG. 17B, the astigmatism is shown at the d-line (λ=587.6 nm) for both the sagittal image surface S and the tangential image surface T. In FIG. 17C, the distortion is shown at the d-line (λ=587.6 nm). The half-field angle ω for FIGS. 17B–17D is 45.2°. FIG. 17D shows the lateral color at the F-line (λ=4.86 nm) and the C-line (λ=656.3 nm) relative to the d-line (λ=587.6 nm). As is apparent from these figures, the various aberrations are favorably corrected.

Hence, this projection display device achieves excellent optical performance with a compact design and makes production at low cost possible with a suitable wide-angle projection lens.

The structure of the projection display device of Embodiment 3 will now be further described with further reference to FIGS. 5A–5B and FIG. 7. As shown in FIGS. 5A–5B, the light source and other optical elements on the reducing side of the dichroic mirror 16 form an illumination optical system 61 and dichroic mirror 16 and several optical elements that follow on the enlarging side of the dichroic mirror 16 form color separating and color combining structures that define a color separating/combining system 62 (as shown in FIG. 5A), which is similarly illustrated in FIG. 8A with regard to Embodiment 5. In Embodiment 3, the optical axis of the illumination optical system 61, which is on the reducing side of the color combining/separating system 62, is parallel or nearly parallel to the optical axis of the first lens group G1, which is on the enlarging side of the color separating/combining system 62. The optical path is not folded within the illumination optical system 61. However, the optical path is folded by a flat, total reflection mirror 66 within the first lens group G1. At a later stage on the enlarging side of the first lens group G1, the optical path is further folded by a total reflection mirror 64c to project an image on a screen 65 (FIG. 7).

Light from the light source lamp 10 is reflected by a reflector or ellipsoidal mirror 55 and collimated or nearly collimated by a lens component 56 having negative refractive power before the light reaches a first lens array 12. A polarizing plate 24 is used to adjust shifts of the polarization direction of the light beam exiting PBS 19. A compensating glass plate for equalizing the optical path lengths of the light beams from the RLCDs can be used at this position in place of the polarizing plate 24. The dichroic prism 29 is the optical combiner that transmits the light beam from the PBS 26 and combines it with the light beams incident on the dichroic prism 29 from another direction. It is preferred that the light beams incident on the dichroic prism 29 from the same direction are linearly polarized in the same direction and that direction of polarization be S polarization and the other light beam that is transmitted be P polarized light because P polarized light has higher transmittance than S polarized light. This helps prevent the inaccurate coloring of a projected image. A phase plate having the same effect can be provided in place of the polarizing plate 24.

The projection display device of Embodiment 3 achieves excellent optical performance with a compact design using a suitable projection lens, as is evident from FIGS. 5A–5B and FIG. 7. The projection display device of Embodiment 3, including the projection lens, can be used in a rear projection television. A compact design such as that of Embodiment 3 is particularly useful where it is very important to reduce the overall size from the illumination optical system to the screen.

Furthermore, by folding the optical path using the total reflection mirror 66 within the first lens group G1, the size in one particular direction from the illumination optical system 61 to the screen 65 can be greatly reduced. As shown in FIG. 7, the illumination optical system 61 is contained within the thickness of the projection display device and does not project outwardly from the screen even through the angle between the screen 65 and total reflection mirror 64c is small. This reduces the thickness of the projection display device in the horizontal direction as shown in FIG. 7.

Embodiment 4

The projection display device of Embodiment 3 described above may be constructed so that at least one lens component of the first lens group G1 may be easily interchanged with another lens component so that the focal length of the projection lens of the projection display device may be easily changed. Embodiment 4 is a modified embodiment of the projection display device of Embodiment 3 with the only change being that in Embodiment 4 the first to the seventh lens elements L1 to L7 of the first lens group G1 are different from those of Embodiment 3. Because this is the only change from Embodiment 3, and the lens elements of Embodiment 4 that replace the lens elements of Embodiment 3 are similar to those of Embodiment 3, FIGS. 5A–5B, 6, and 7 well represent Embodiment 4 and separate illustrations are unnecessary.

The exchange of the lens elements can be done, for example, by exchanging an attachment lens device in which the first to seventh lenses L1 to L7 are integrally contained. Such an attachment lens device is indicated schematically in FIG. 6 by a bracket AT. Because devices and techniques for readily interchanging groups of adjacent optical elements, including such attachment lens devices, are well known, further illustration of interchangeable structures disclosed herein is unnecessary. The projection lens favored for production or for projection in a projection display device varies depending on requirements of field angles, optical performance, cost, and other factors. By changing only part of the projection lens of the projection display device, effectively a new projection display device with a new projection lens can be obtained that may meet different requirements without completely replacing the projection display device. This change enables the new requirements to be met at much less cost than replacing the entire projection display device or even the entire projection lens.

Table 9 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 4. The values in Table 9 are based on the normalized focal length of 1.00 mm (i.e., with the projection lens focused at infinity) for Embodiment 3 above in order for the comparison with Embodiment 4 to be clear. The changes in Embodiment 4 results in the projection lens of Embodiment 4 having a focal length of 1.62, which is larger than the unity focal length of Embodiment 3. Embodiment 4 has a large field angle but not as large a field angle as Embodiment 3. The lens elements on the enlarging end, particularly the first lens element L1, can have smaller diameters than those of Embodiment 3, which allows the projection lens of Embodiment 4 to be compact. For Embodiment 4, the diagonal dimension LVD of the display elements (RLCDs) is 1.02 mm and the f-number $F_{NO}$ of the projection lens of Embodiment 4 based on Table 9 is 2.80.

TABLE 9

| # | R | D | $N_d$ | $v_d$ |
|---|---|---|---|---|
| 1 | 5.1642 | 1.2746 | 1.71300 | 53.9 |
| 2 | 17.4944 | 0.0375 | | |
| 3 | 3.6413 | 0.3976 | 1.48749 | 70.2 |
| 4 | 2.2189 | 0.7319 | | |
| 5 | 17.4359 | 0.2272 | 1.84665 | 23.8 |
| 6 | 2.2678 | 0.4770 | | |
| 7 | ∞ | 0.1931 | 1.84665 | 23.8 |
| 8 | 2.5185 | 2.6663 | | |
| 9 | 12.9781 | 0.7111 | 1.71300 | 53.9 |
| 10 | −4.1487 | 1.5782 | | |
| 11 | 6.0474 | 0.2193 | 1.69680 | 55.5 |
| 12 | 1.6415 | 0.5919 | 1.84665 | 23.8 |
| 13 | 17.3848 | 0.6717 | | |
| 14 | ∞ (mask) | 0.0867 | | |
| 15 | −3.0113 | 0.1704 | 1.84665 | 23.8 |
| 16 | 2.2499 | 0.4430 | 1.48749 | 70.2 |
| 17 | −2.0307 | 0.2272 | | |
| 18 | ∞ | 2.4090 | 1.51633 | 64.1 |
| 19 | ∞ | 0.5680 | | |
| 20 | 6.6275 | 0.7191 | 1.48749 | 70.2 |
| 21 | −3.1761 | 0.0329 | | |
| 22 | 4.2414 | 0.8156 | 1.49700 | 81.6 |
| 23 | −2.8990 | 0.1590 | 1.84665 | 23.8 |
| 24 | −12.8710 | 0.5794 | | |
| 25 | ∞ | 0.5261 | 1.51633 | 64.1 |
| 26 | ∞ | 1.9312 | 1.84138 | 24.6 |
| 27 | ∞ | 0.3000 | 1.51633 | 64.1 |
| 28 | ∞ | | | |

The projection display device of Embodiment 4 satisfies Conditions (A)–(C) above, as set forth in Table 10 below.

TABLE 10

| Condition | Condition Inequality | Value |
|---|---|---|
| (A) | $1.0 < f2/f < 8.0$ | 2.12 |
| (B) | $LVD/\{4 \cdot (1 - 2 \cdot \tan \theta)\} < Bf < LVD/(1 - 2 \cdot \tan \theta') + LVD$ | 2.24 |
| (C) | $0.25 < d/f2 < 1.0$ | 0.69 |

Figures 18A, 18B, 18C, 18D:
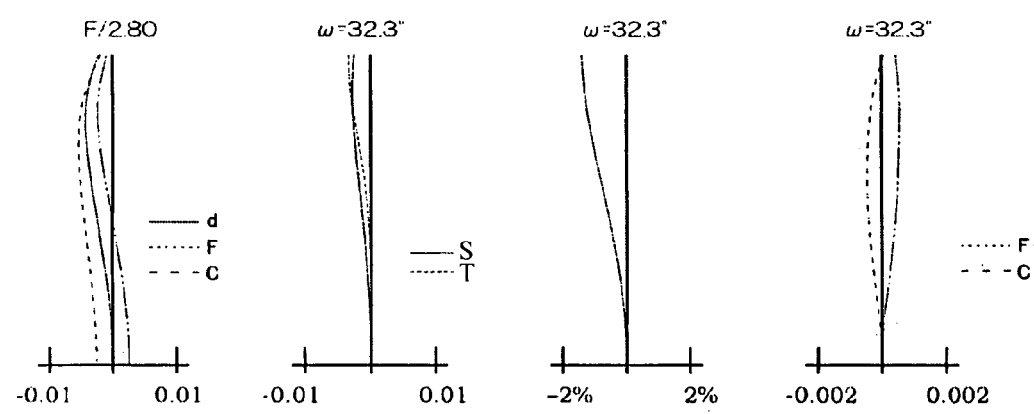
FIGS. 18A–18D show the spherical aberration, astigmatism, distortion, and lateral color, respectively, of the projection lens according to Embodiment 4.

FIGS. 18A–18D show the spherical aberration, astigmatism, distortion, and lateral color, respectively, of the projection lens according to Embodiment 4 with the distance to the enlarging side imaging point (the screen position) from the lens surface on the reducing end of the projection lens being 130.6 mm. In FIG. 18A, the spherical aberration is shown for the d-line (λ=587.6 nm), the F-line (λ=4.86 nm), and the C-line (λ=656.3 nm). As shown in FIG. 18A, the f-number is 2.80. In FIG. 18B, the astigmatism is shown at the d-line (λ=587.6 nm) for both the sagittal image surface S and the tangential image surface T. In FIG. 18C, the distortion is shown at the d-line (λ=587.6 nm). The half-field angle ω for FIGS. 18B–18D is 32.3°. FIG. 18D shows the lateral color at the F-line (λ=4.86 nm) and the C-line (λ=656.3 nm) relative to the d-line (λ=587.6 nm). As is apparent from these figures, the various aberrations are favorably corrected.

Hence, this projection display device achieves excellent optical performance with a compact design and makes production at low cost possible with a suitable wide-angle projection lens.

As explained above, the projection display device of Embodiment 4 has a very similar construction to that of Embodiment 3. However, the projection lens of Embodiment 4 has a comparatively longer focal length than the projection lens of Embodiment 3. Therefore, Embodiment 5, which will be described next, may be preferred to Embodiment 4. In Embodiment 5, the optical path is not folded within the first lens group G1 because such folding is unnecessary to make a compact projection display device.

Embodiment 5

Figure 8A:
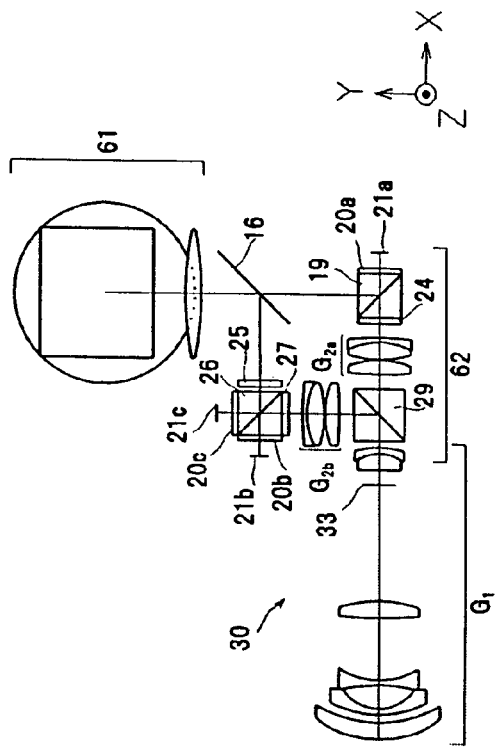
FIGS. 8A–8B show cross-sectional views of a projection display device according to Embodiment 5.
Figure 8B:
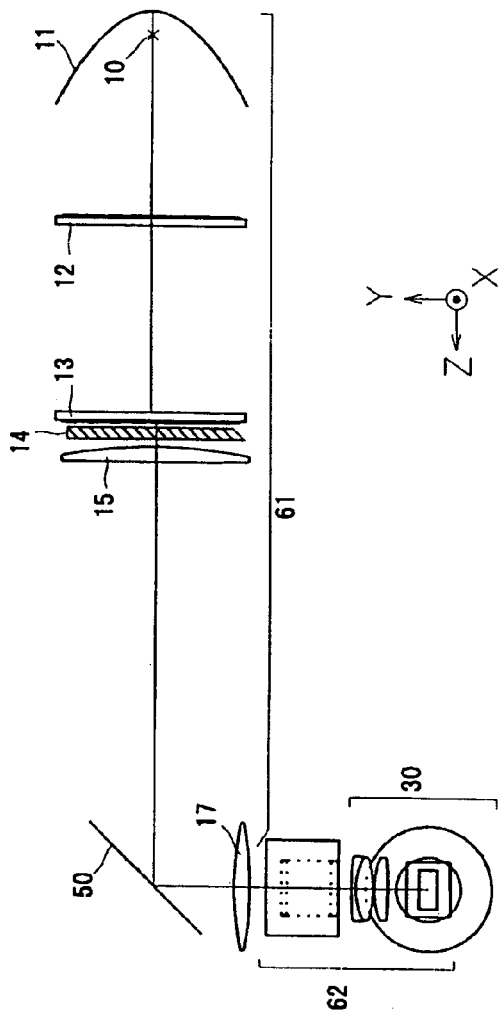
Figure 9:
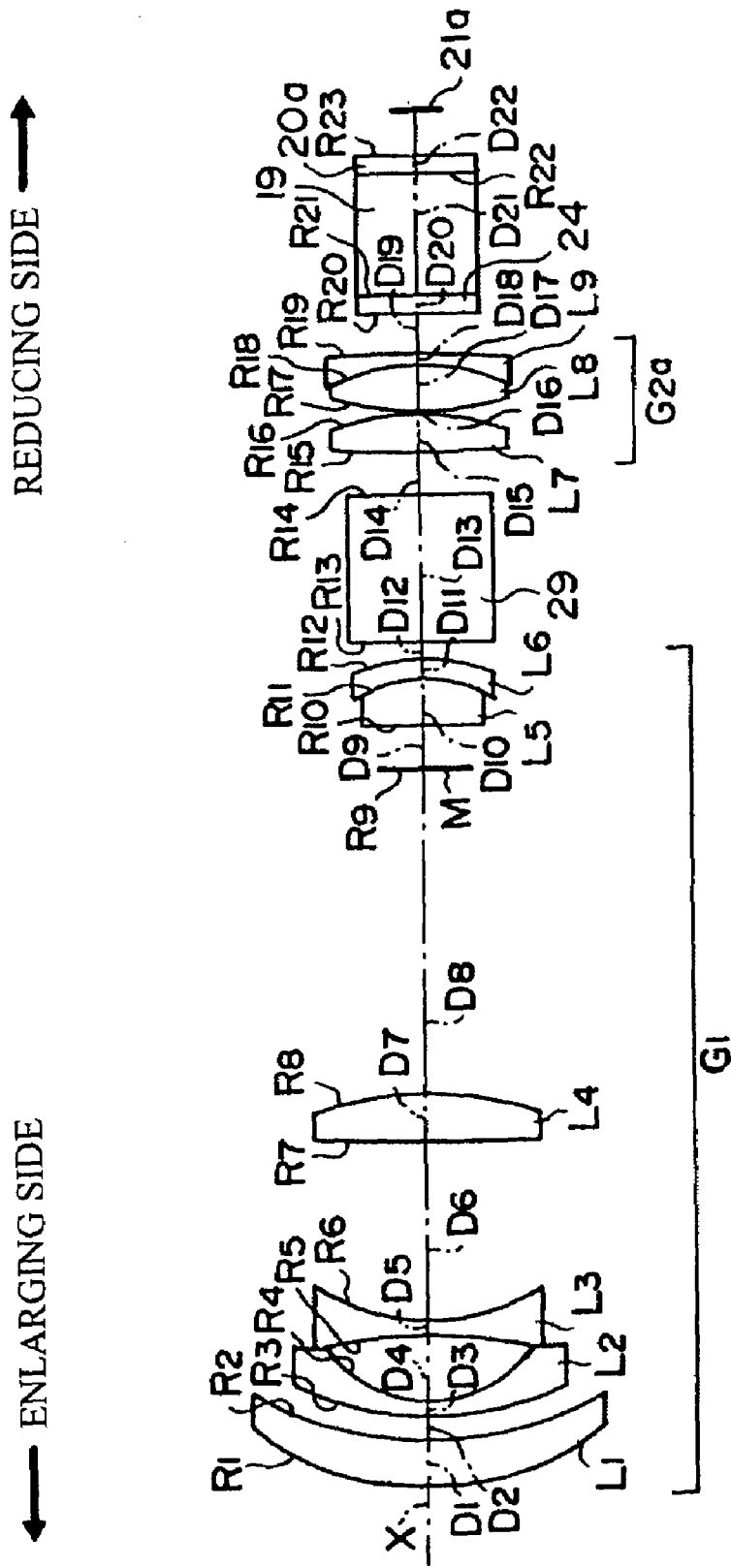
FIG. 9 shows an enlarged cross-sectional view of a projection lens portion of the projection display device of FIGS. 8A–8B.
Figure 10A:
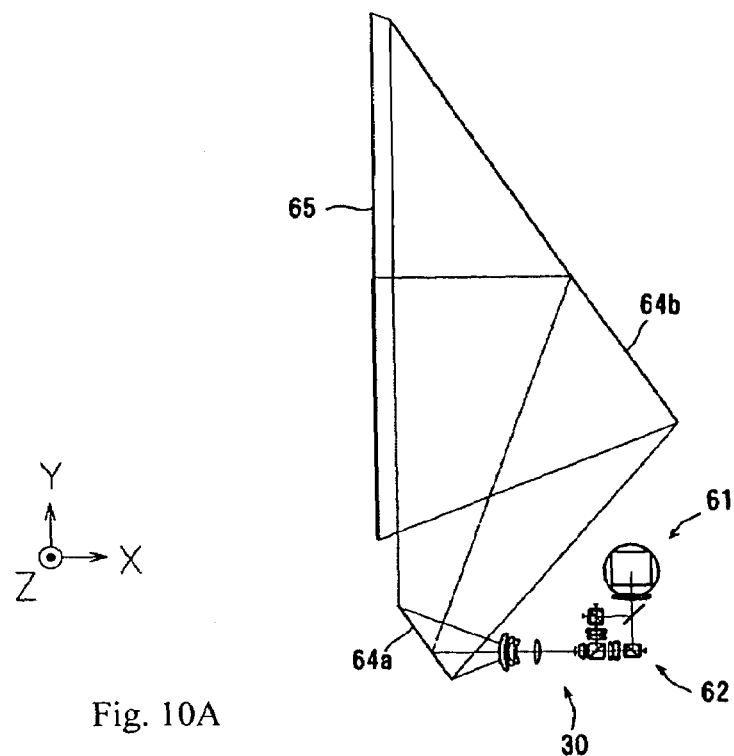
FIGS. 10A–10B show cross-sectional views of a rear projection television that includes a projection display device according to Embodiment 5.
Figure 10B:
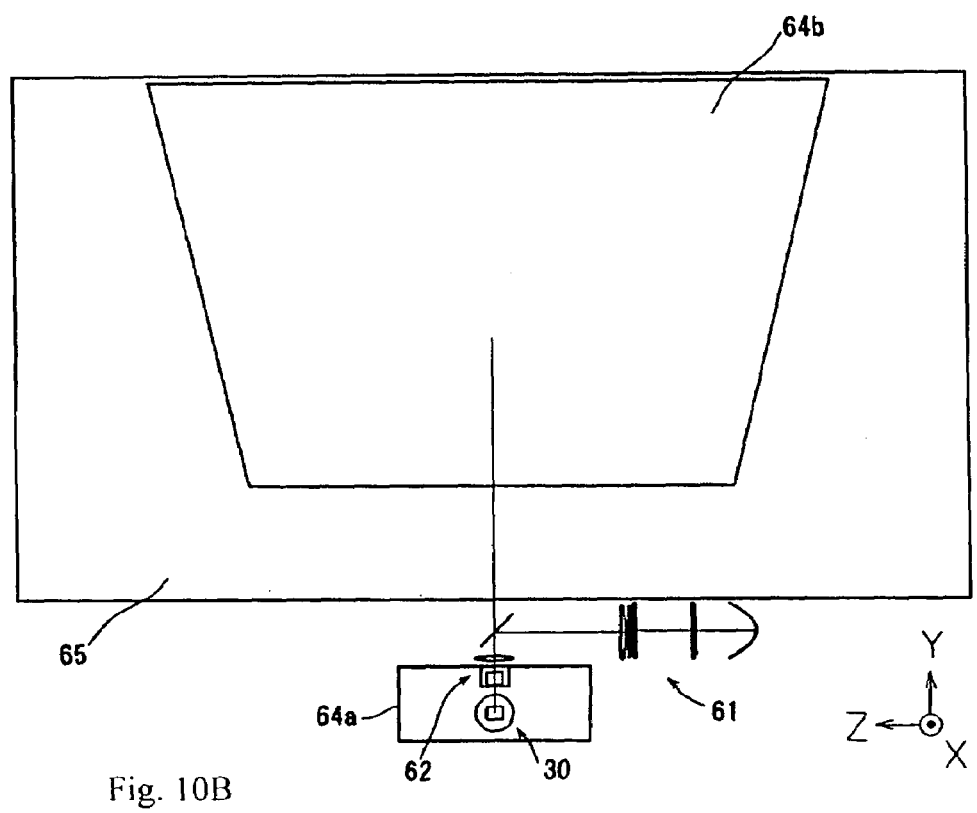

FIGS. 8A–8B show cross-sectional views of a projection display device according to Embodiment 5. FIG. 9 shows an enlarged cross-sectional view of a projection lens portion of the projection display device of FIGS. 8A–8B. FIGS. 10A–10B show cross-sectional views of a rear projection television that includes a projection display device according to Embodiment 5. FIG. 9 shows the structure of the projection lens 30. FIGS. 10A and 10B show the entire projection display device including the illumination optical system 61 at the reducing end and the screen 65 at the enlarging end. For Embodiment 5, FIG. 9, similar to FIG. 2 for Embodiment 1, shows a second lens group G2a and an RLCD 21a that are representative of the multiple second lens groups G2a and G2b, which have the same structure, and the multiple RLCDs 21a, 21b, and 21c. The projection lens 30 of Embodiment 5 has nearly the same structure as in Embodiment 1. However, as shown in FIG. 9, the first lens group G1 includes a first lens element L1, a second lens element L2, and so forth only up to and including a sixth lens element L6 and each of the second lens groups G2a and G2b includes a seventh lens element L7, an eighth lens element L8, and a ninth lens element L9. Both surfaces of the first lens element L1 of this projection lens 30 are aspheric, and the shapes of the aspheric surfaces are expressed by Equation (A) above.

Table 11 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 5. The values in Table 11 are based on a normalized focal length of 1 mm (i.e., with the projection lens focused at infinity). For Embodiment 5, the diagonal dimension LVD of the display elements (RLCDs) is 1.57 mm and the f-number $F_{NO}$ of the projection lens of Embodiment 5 based on Table 11 is 2.60.

TABLE 11

| # | R | D | $N_d$ | $v_d$ |
|---|---|---|---|---|
| 1* | 5.5208 | 0.6530 | 1.50842 | 56.4 |
| 2* | 4.6385 | 0.3232 | | |
| 3 | 4.2647 | 0.2351 | 1.77250 | 49.6 |
| 4 | 1.8131 | 0.9341 | | |
| 5 | −6.9065 | 0.1959 | 1.74400 | 44.8 |

TABLE 11-continued

| # | R | D | $N_d$ | $v_d$ |
|---|---|---|---|---|
| 6 | 3.0692 | 2.4932 | | |
| 7 | 19.5406 | 0.6869 | 1.74400 | 44.8 |
| 8 | −5.1100 | 4.7416 | | |
| 9 | ∞ (mask) | 0.6085 | | |
| 10 | 33.3779 | 0.6882 | 1.48749 | 70.2 |
| 11 | −1.7453 | 0.2612 | 1.77250 | 49.6 |
| 12 | −3.1735 | 0.2613 | | |
| 13 | ∞ | 2.1165 | 1.51633 | 64.1 |
| 14 | ∞ | 0.5877 | | |
| 15 | 14.2171 | 0.5812 | 1.51633 | 64.1 |
| 16 | −3.4252 | 0.0262 | | |
| 17 | 4.4531 | 0.7004 | 1.48749 | 70.2 |
| 18 | −2.7768 | 0.1698 | 1.84665 | 23.8 |
| 19 | −12.6930 | 0.7444 | | |
| 20 | ∞ | 0.6497 | 1.51633 | 64.1 |
| 21 | ∞ | 1.7631 | 1.77250 | 49.6 |
| 22 | ∞ | 0.3000 | 1.51633 | 64.1 |
| 23 | ∞ | | | |

The surfaces with a * to the right of the surface number in Table 11 are aspheric lens surfaces, and the aspheric surface shapes are expressed by Equation (A) above.

Table 12 below lists the values of the constant K and the aspheric coefficients $A_2$–$A_5$ used in Equation (A) above for each of the aspheric lens surfaces of Table 11. Aspheric coefficients that are not present in Table 12 are zero. An "E" in the data indicates that the number following the "E" is the exponent to the base 10. For example, "1.0E-2" represents the number $1.0 \times 10^{-2}$.

TABLE 12

| # | K | $A_2$ | $A_3$ | $A_4$ | $A_5$ |
|---|---|---|---|---|---|
| 1 | 3.1975 | 2.6234E−3 | −6.0758E−5 | 2.7767E−6 | 1.2107E−7 |
| 2 | 0.0191 | −5.2716E−4 | 4.2341E−6 | −5.4398E−7 | 1.6550E−8 |

The projection display device of Embodiment 5 satisfies Conditions (A)–(C) above, as set forth in Table 13 below.

TABLE 13

| Condition | Condition Inequality | Value |
|---|---|---|
| (A) | $1.0 < f2/f < 8.0$ | 4.19 |
| (B) | $LVD/\{4 \cdot (1 - 2 \cdot \tan \theta)\} < Bf < LVD/(1 - 2 \cdot \tan \theta') + LVD$ | 2.37 |
| (C) | $0.25 < d/f2 < 1.0$ | 0.54 |

Figures 19A, 19B, 19C, 19D:
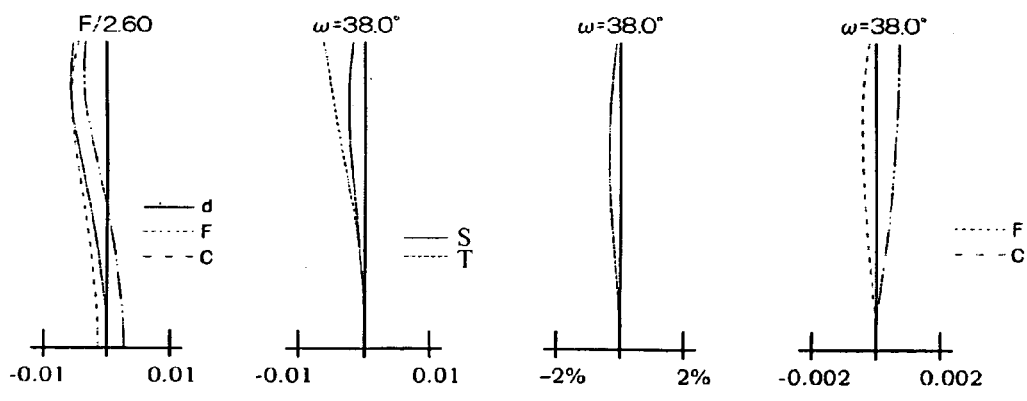
FIGS. 19A–19D show the spherical aberration, astigmatism, distortion, and lateral color, respectively, of the projection lens according to Embodiment 5.

FIGS. 19A–19D show the spherical aberration, astigmatism, distortion, and lateral color, respectively, of the projection lens according to Embodiment 5 with the distance to the enlarging side imaging point (the screen position) from the lens surface on the reducing end of the projection lens being 122.2 mm. In FIG. 19A, the spherical aberration is shown for the d-line (λ=587.6 nm), the F-line (λ=4.86 nm), and the C-line (λ=656.3 nm). As shown in FIG. 19A, the f-number is 2.60. In FIG. 19B, the astigmatism is shown at the d-line (λ=587.6 nm) for both the sagittal image surface S and the tangential image surface T. In FIG. 19C, the distortion is shown at the d-line (λ=587.6 nm). The half-field angle ω for FIGS. 19B–19D is 38.0°. FIG. 19D shows the lateral color at the F-line (λ=4.86 nm) and the C-line (λ=656.3 nm) relative to the d-line (λ=587.6 nm). As is apparent from these figures, the various aberrations are favorably corrected.

Hence, this projection display device achieves excellent optical performance with a compact design and makes production at low cost possible with a suitable wide-angle projection lens. The lens elements on the enlarging side, particularly the first lens element L1 of this embodiment, can have smaller diameters than those of Embodiment 3. Therefore, the projection lens 30 is allowed to have a smaller field angle than that of Embodiment 3. This advantageously allows the projection lens to have a compact structure.

The structure of the projection display device of Embodiment 5 will now be further described with further reference to FIGS. 8A–8B and FIGS. 10A–10B. In Embodiment 5, the optical axis of the illumination optical system 61, which is on the reducing side of the color separating/combining system 62, is nearly orthogonal to the optical axis of the first lens group G1, which is on the enlarging side of the color separating/combining system 62. The optical path is not folded within the first lens group G1 following the color separating/combining system 62. However, it is folded by a total reflection mirror 50 within the illumination optical system 61. The optical path is also folded by two total reflection mirrors 64a and 64b after the first lens group G1 to project an image on a screen 65.

The projection display device of Embodiment 5 achieves excellent optical performance with a compact design using a suitable wide-angle projection lens, as is evident from FIGS. 8A–8B and FIGS. 10A–10B. The projection display device of Embodiment 5, including the projection lens, can be used in a rear projection television with a different arrangement than that of Embodiment 3. For example, the angle between the screen 65 and the total reflection mirror 64b is slightly larger in Embodiment 5 than in Embodiment 3 (see FIG. 7).

Embodiment 6

FIG. 11 shows a cross-sectional view of a projection display device according to Embodiment 6. FIG. 11 shows the structure of the projection lens with the lens element numbers, surface numbers, and lens element on-axis surface spacings, including those of a second lens group G2b, along with a RLCD 21b, represented in the manner discussed earlier with regard to FIG. 2 and Embodiment 1. In Embodiment 6, the lens groups G2a to G2c have the same structure, and the projection lens has nearly the same structure, as in Embodiment 1. However, as shown in FIG. 11, the first lens group G1 includes a first lens element L1, a second lens element L2, and so forth only up to and including a seventh lens element L7 and each of the second lens groups G2a–G2c includes an eighth lens element L8, a ninth lens element L9, and a tenth lens element L10. Both surfaces of the first lens element L1 of this projection lens are aspheric, and the shapes of the aspheric surfaces are expressed by Equation (A) above. The projection lens also includes masks M1 and M2.

As shown in FIG. 11, an X-shaped dichroic prism 48 is the optical combiner in Embodiment 6 and it receives light beams from RLCDs 21a to 21c, which are the display elements, from three different directions. The X-shaped dichroic prism includes two dichroic surfaces that serve to reflect the modulated light beams of the RLCDs 21a and 21c and to transmit the modulated light beam from the RLCD 21b in order to combine them and project them in a common direction.

The projection lens has three second lens groups G2a, G2b, and G2c so that the different lights beams from the RLCDs 21a to 21c pass through a different one of the PBSs 19a, 19b, and 19c that are light separating structures for separating the illumination light beams from the projection light beams before they are incident on the optical combiner. The second lens group G2a and the first lens group G1 serve as the projection lens for the first color light beam reflected by the RLCD 21a, the second lens group G2b and the first lens group G1 serve for the second color light beam reflected by the RLCD 21b, and the second lens group G2c and the first lens group G1 serve for the third color light beam reflected by the RLCD 21c among the projection light beams modulated with the respective color image information. Polarizing plates 24a, 24b, and 24c serve similarly to the polarizing plate 24 described previously with regard to Embodiment 3. At least one of the polarizing plates 24a, 24b, and 24c can be replaced with a compensating glass plate or a phase plate.

Table 14 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 6. The values in Table 14 are based on a normalized focal length of 1 mm (i.e., with the projection lens focused at infinity). For Embodiment 6, the diagonal dimension LVD of the display elements (RLCDs) is 2.00 mm and the f-number $F_{NO}$ of the projection lens of Embodiment 6 based on Table 14 is 2.60.

TABLE 14

| # | R | D | $N_d$ | $v_d$ |
|---|---|---|---|---|
| 1* | 19.9914 | 0.8325 | 1.50842 | 56.4 |
| 2* | 12.9784 | 1.5407 | | |
| 3 | 7.1015 | 0.4662 | 1.84665 | 23.8 |
| 4 | 3.2890 | 0.9941 | | |
| 5 | 10.8197 | 0.2997 | 1.69680 | 55.5 |
| 6 | 3.6138 | 1.1236 | | |
| 7 | −10.8935 | 0.2498 | 1.62041 | 60.3 |
| 8 | 6.9191 | 4.0392 | | |
| 9 | 30.5338 | 1.0239 | 1.64769 | 33.8 |
| 10 | −7.3003 | 8.0941 | | |
| 11 | ∞ (mask) | 0.8486 | | |
| 12 | 8.7496 | 0.7445 | 1.48749 | 70.2 |
| 13 | −3.5833 | 0.3330 | 1.80610 | 40.9 |
| 14 | −8.4209 | 0.3830 | | |
| 15 | ∞ (mask) | 0.6706 | | |
| 16 | ∞ | 2.6984 | 1.51633 | 64.1 |
| 17 | ∞ | 0.7493 | | |
| 18 | 24.6159 | 0.6622 | 1.62041 | 60.3 |
| 19 | −5.3415 | 0.0335 | | |
| 20 | 5.2314 | 0.8931 | 1.58913 | 61.2 |
| 21 | −3.6706 | 0.2165 | 1.84666 | 23.8 |
| 22 | −51.9613 | 0.9491 | | |
| 23 | ∞ | 0.9109 | 1.51633 | 64.1 |
| 24 | ∞ | 2.2479 | 1.77250 | 49.6 |
| 25 | ∞ | 0.3000 | 1.51633 | 64.1 |
| 26 | ∞ | | | |

The surfaces with a * to the right of the surface number in Table 14 are aspheric lens surfaces, and the aspheric surface shapes are expressed by Equation (A) above.

Table 15 below lists the values of the constant K and the aspheric coefficients $A_2$–$A_5$ used in Equation (A) above for each of the aspheric lens surfaces of Table 14. Aspheric coefficients that are not present in Table 15 are zero. An "E" in the data indicates that the number following the "E" is the exponent to the base 10. For example, "1.0E-2" represents the number $1.0 \times 10^{-2}$.

TABLE 15

| # | K | $A_2$ | $A_3$ | $A_4$ | $A_5$ |
|---|---|---|---|---|---|
| 1 | 2.2992 | 1.0654E-3 | -2.0239E-5 | 4.9420E-7 | -9.2797E-9 |
| 2 | 1.3348 | 2.7012E-4 | -1.1380E-7 | -6.2617E-7 | 7.9408E-9 |

The projection display device of Embodiment 6 satisfies Conditions (A)–(C) above, as set forth in Table 16 below.

TABLE 16

| Condition | Condition Inequality | Value |
|---|---|---|
| (A) | 1.0 < f2/f < 8.0 | 4.87 |
| (B) | LVD/{4 · (1 − 2 · tan θ)} < Bf < LVD/(1 − 2 · tan θ') + LVD | 3.02 |
| (C) | 0.25 < d/f2 < 1.0 | 0.66 |

Figures 20A, 20B, 20C, 20D:
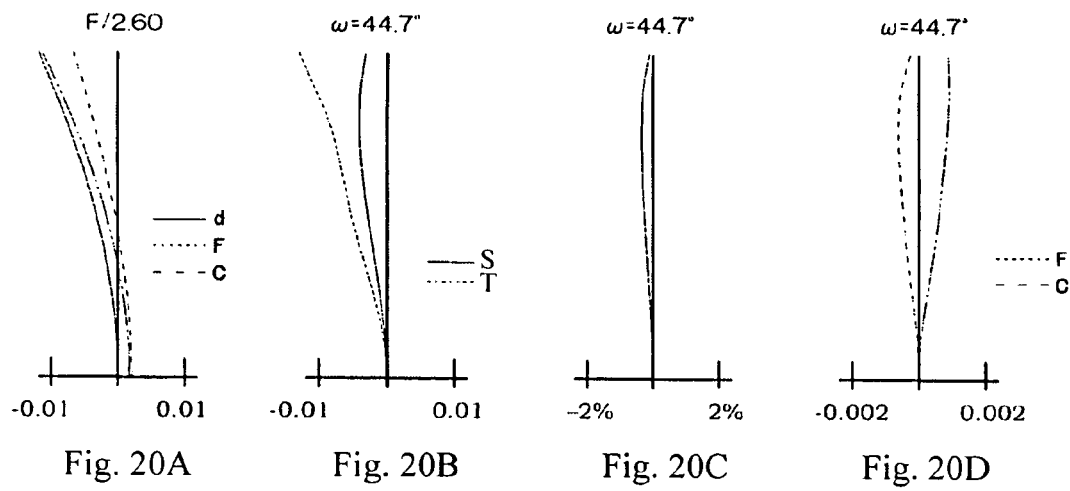
FIGS. 20A–20D show the spherical aberration, astigmatism, distortion, and lateral color, respectively, of the projection lens according to Embodiment 6.

FIGS. 20A–20D show the spherical aberration, astigmatism, distortion, and lateral color, respectively, of the projection lens according to Embodiment 6 with the distance to the enlarging side imaging point (the screen position) from the lens surface on the reducing end of the projection lens being 119.9 mm. In FIG. 20A, the spherical aberration is shown for the d-line (λ=587.6 nm), the F-line (λ=4.86 nm), and the C-line (λ=656.3 nm). As shown in FIG. 20A, the f-number is 2.60. In FIG. 20B, the astigmatism is shown at the d-line (λ=587.6 nm) for both the sagittal image surface S and the tangential image surface T. In FIG. 20C, the distortion is shown at the d-line (λ=587.6 nm). The half-field angle ω for FIGS. 20B–20D is 44.7°. FIG. 20D shows the lateral color at the F-line (λ=4.86 mn) and the C-line (λ=656.3 nm) relative to the d-line (λ=587.6 nm). As is apparent from these figures, the various aberrations are favorably corrected.

As Embodiment 6 shows, the projection display device of the present invention is not limited to the optical combiner receiving light beams from only two different directions, but may receive light beams from three different directions. As is also clear, this projection display device achieves excellent optical performance with a compact design and makes production at low cost possible with a suitable wide-angle projection lens as do previously described embodiments that use only two second lens groups. Additionally, Embodiment 6 eliminates the risk of disturbing the polarization properties of the projection light beams, so that contrast of the image and the efficiency of light use can be improved. The second lens groups are telecentric or nearly telecentric on the reducing sides, which also improves light use efficiency as achieving more uniform illumination and better color distributions on the projection screen.

Also, when an X-shaped dichroic prism is used as the optical combiner, cross lines caused by the X-shaped dichroic prism are less visible in the projected image in Embodiment 6 that uses three second lens groups corresponding to the three color light beams on the reducing side of the optical combiner than cross lines of previously described embodiments.

The projection display device of Embodiment 6, including the projection lens described, may use elements that are the same or very similar to those of Embodiment 1. Elements may be used to fold the optical path, although such elements may be included in areas of the projection display device not shown in FIG. 11, including areas where elements on the reducing side of the illumination PBSs 19a to 19c that act on the illumination light, such as a light source itself, an integrator optical system, or a polarization conversion optical system, are placed. The projection display device, including the projection lens, of Embodiment 6, as shown in FIG. 11, operates efficiently as a compact projection display device.

Embodiment 7

Figure 12:
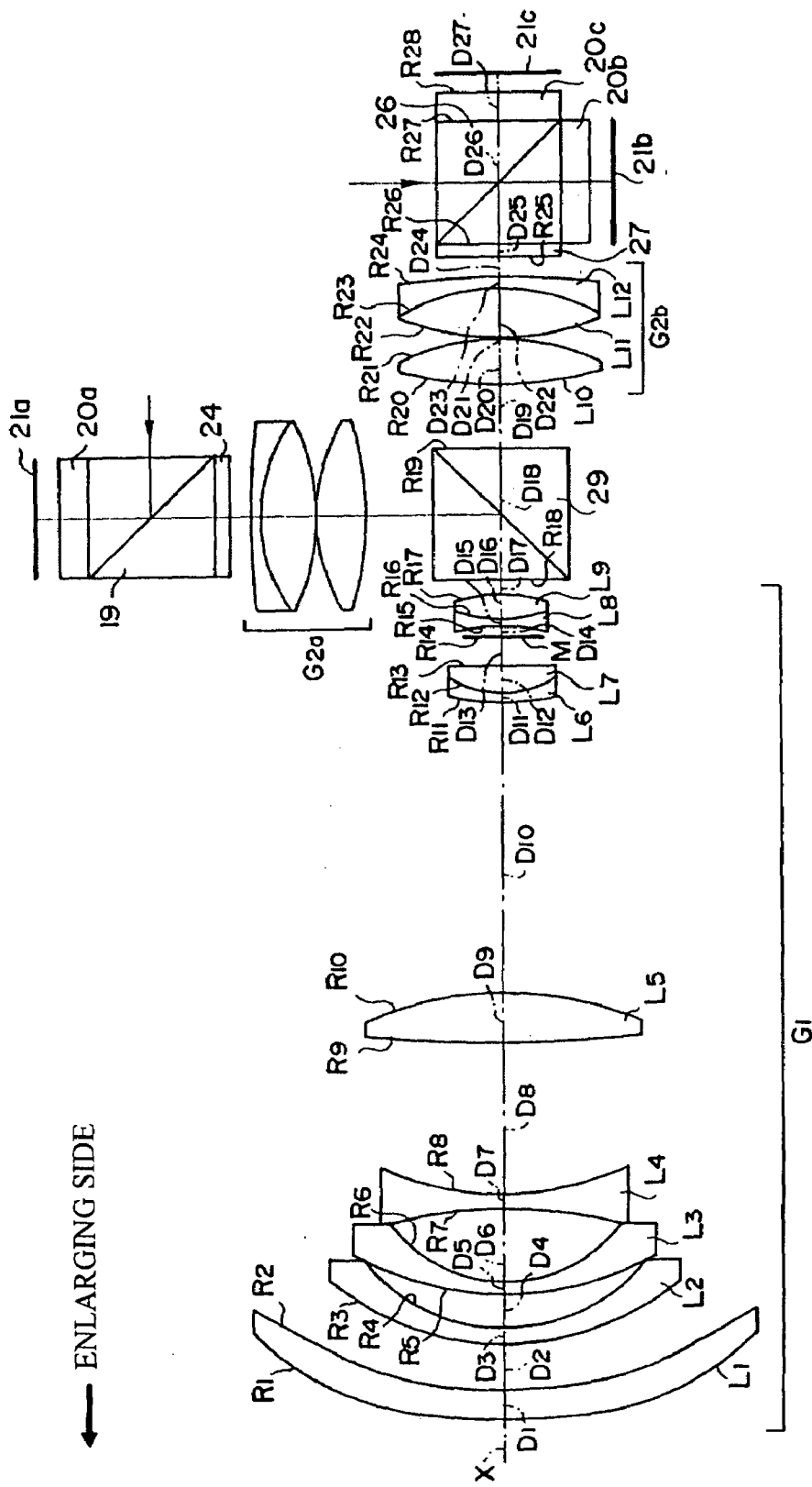
FIG. 12 shows a cross-sectional view of a projection display device according to Embodiment 7.

FIG. 12 shows a cross-sectional view of a projection display device according to Embodiment 7. FIG. 12 shows the structure of the projection lens with the lens element numbers, surface numbers, and lens element on-axis surface spacings, including those of a second lens group G2b, along with a RLCD 21c, represented in the manner discussed earlier with regard to FIG. 2 and Embodiment 1. In Embodiment 7, the lens groups G2a to G2b have the same structure, and the projection lens has nearly the same structure as in Embodiment 1. However, as shown in FIG. 11, the first lens group G1 includes a first lens element L1, a second lens element L2, and so forth only up to and including a ninth lens element L9 and each of the second lens groups G2a and G2b include a tenth lens element L10, an eleventh lens element L11, and a twelfth lens element L12. Both surfaces of the first lens element L1 of this projection lens 30 are aspheric, and the shapes of the aspheric surfaces are expressed by Equation (A) above.

Table 17 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 7. The values in Table 17 are based on a normalized focal length of 1 mm (i.e., with the projection lens focused at infinity). For Embodiment 7, the diagonal dimension LVD of the display elements (RLCDs) is 1.01 mm and the f-number $F_{NO}$ of the projection lens of Embodiment 7 based on Table 17 is 2.80.

TABLE 17

| # | R | D | $N_d$ | $v_d$ |
|---|---|---|---|---|
| 1* | 16.5979 | 0.4529 | 1.53039 | 55.2 |
| 2* | 8.2369 | 0.7110 | | |
| 3 | 4.0080 | 0.2491 | 1.62041 | 60.3 |
| 4 | 2.7024 | 0.5413 | | |
| 5 | 4.5765 | 0.2151 | 1.62041 | 60.3 |
| 6 | 2.1649 | 1.1548 | | |
| 7 | -6.1218 | 0.1812 | 1.84665 | 23.8 |
| 8 | 3.9416 | 2.4127 | | |
| 9 | 19.8239 | 0.7540 | 1.78590 | 44.2 |
| 10 | -5.3279 | 4.6635 | | |
| 11 | 4.5292 | 0.1144 | 1.62041 | 60.3 |
| 12 | 1.3308 | 0.4404 | 1.72825 | 28.5 |
| 13 | ∞ | 0.4687 | | |
| 14 | ∞ (mask) | 0.1698 | | |
| 15 | -2.9165 | 0.1132 | 1.80517 | 25.4 |
| 16 | 2.0718 | 0.4121 | 1.48749 | 70.2 |
| 17 | -2.0718 | 0.2264 | | |
| 18 | ∞ | 2.1065 | 1.51633 | 64.1 |
| 19 | ∞ | 1.0156 | | |
| 20 | 5.8845 | 0.7303 | 1.48749 | 70.2 |
| 21 | -3.3617 | 0.0226 | | |
| 22 | 4.2357 | 0.8039 | 1.48749 | 70.2 |
| 23 | -2.8893 | 0.1585 | 1.84665 | 23.8 |
| 24 | -13.9292 | 0.3068 | | |
| 25 | ∞ | 0.2135 | 1.51633 | 64.1 |
| 26 | ∞ | 1.9247 | 1.84138 | 24.6 |
| 27 | ∞ | 0.4366 | 1.51633 | 64.1 |
| 28 | ∞ | | | |

The surfaces with a * to the right of the surface number in Table 17 are aspheric lens surfaces, and the aspheric surface shapes are expressed by Equation (A) above.

Table 18 below lists the values of the constant K and the aspheric coefficients $A_2$–$A_5$ used in Equation (A) above for each of the aspheric lens surfaces of Table 17. Aspheric coefficients that are not present in Table 18 are zero. An "E" in the data indicates that the number following the "E" is the exponent to the base 10. For example, "1.0E-2" represents the number $1.0 \times 10^{-2}$.

TABLE 18

| # | K | $A_2$ | $A_3$ | $A_4$ | $A_5$ |
|---|---|---|---|---|---|
| 1 | 1.4139 | 6.6866E-3 | -3.0539E-4 | 1.5277E-5 | -3.6657E-7 |
| 2 | 0.5234 | 4.9096E-3 | -1.6165E-4 | -9.6354E-6 | 3.8909E-7 |

The projection display device of Embodiment 7 satisfies Conditions (A)–(C) above, as set forth in Table 19 below.

TABLE 19

| Condition | Condition Inequality | Value |
|---|---|---|
| (A) | 1.0 < f2/f < 8.0 | 3.55 |
| (B) | LVD/{4 · (1 − 2 · tan θ)} < Bf < LVD/(1 − 2 · tan θ') + LVD | 2.12 |
| (C) | 0.25 < d/f2 < 1.0 | 0.74 |

Figures 21A, 21B, 21C, 21D:
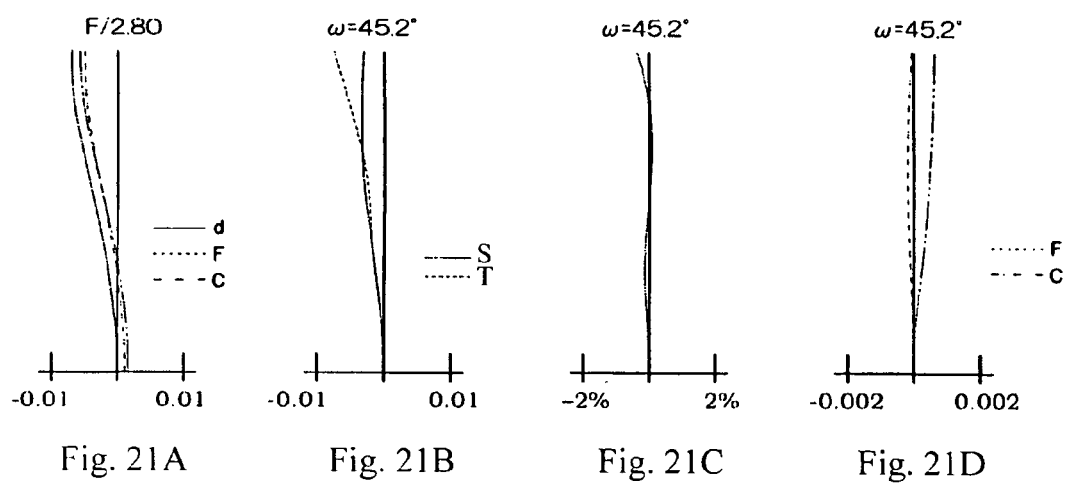
FIGS. 21A–21D show the spherical aberration, astigmatism, distortion, and lateral color, respectively, of the projection lens according to Embodiment 7.

FIGS. 21A–21D show the spherical aberration, astigmatism, distortion, and lateral color, respectively, of the projection lens according to Embodiment 7 with the distance to the enlarging side imaging point (the screen position) from the lens surface on the reducing end of the projection lens being 79.9 mm. In FIG. 21A, the spherical aberration is shown for the d-line (λ=587.6 nm), the F-line (λ=4.86 nm), and the C-line (λ=656.3 nm). As shown in FIG. 21A, the f-number is 2.80. In FIG. 21B, the astigmatism is shown at the d-line (λ=587.6 nm) for both the sagittal image surface S and the tangential image surface T. In FIG. 21C, the distortion is shown at the d-line (λ=587.6 nm). The half-field angle ω for FIGS. 21B–21D is 45.2°. FIG. 21D shows the lateral color at the F-line (λ=4.86 nm) and the C-line (λ=656.3 nm) relative to the d-line (λ=587.6 nm). As is apparent from these figures, the various aberrations are favorably corrected.

Hence, this projection display device achieves excellent optical performance with a compact design and makes production at low cost possible with a suitable wide-angle projection lens.

The projection display device of Embodiment 7, including the projection lens described, may use elements that are the same or very similar to those of Embodiment 1, although various such elements are not shown in FIG. 12, including elements on the reducing side of the illumination PBSs 19 and 26, such as the light source itself, an integrator optical system, or a polarization conversion optical system. The projection display device, including the projection lens, of Embodiment 7, as shown in FIG. 12, operates efficiently as a compact projection display device.

Embodiment 8

The projection display device of the present invention can be provided with an exchangeable polarized beam splitting prism on the reducing side of at least one of the multiple second lens groups for combining light beams from at least two display elements. Part of the first lens group and/or the second lens groups can be replaced according to the exchange of the polarized beam splitting prism so as to correct changes in imaging performance caused by material changes of the polarized beam splitting prism with the exchange.

In Embodiment 8 of the present invention, the PBSs 19 and 26 provided on the reducing side of the second lens groups G2a and G2b as the light separating structures for separating the illumination light beams from the projection light beams depending on polarizations, part of the first lens group G1, i.e., the sixth to ninth lens elements L6 to L9, and the tenth to the twelfth lens elements L10 to L12 of the second lens groups G2a and G2b in the projection lens of Embodiment 7 are exchangeable. For example, the PBS 26 of Embodiment 7 has an $N_d$ of 1.84138, which is changed to 1.80100 in Embodiment 8. The sixth to ninth lens elements L6 to L9 and the tenth to twelfth lens elements L10 to L12 of Embodiment 8 are constructed to correct changes in imaging performance caused by material changes due to exchanging the PBS 26. This Embodiment 8 has nearly the same structure as Embodiment 7 in FIG. 12 and therefore a separate illustration of Embodiment 8 is unnecessary. The second lens groups G2a and G2b have the same structure in Embodiments 7 and 8.

Table 20 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 8. The values in Table 20 are based on a normalized focal length of 1 mm (i.e., with the projection lens focused at infinity). For Embodiment 8, the diagonal dimension LVD of the display elements (RLCDs) is 1.01 mm and the f-number $F_{NO}$ of the projection lens of Embodiment 8 based on Table 20 is 2.80.

TABLE 20

| # | R | D | $N_d$ | $v_d$ |
|---|---|---|---|---|
| 1* | 16.5979 | 0.4529 | 1.53039 | 55.2 |
| 2* | 8.2369 | 0.7110 | | |
| 3 | 4.0080 | 0.2491 | 1.62041 | 60.3 |
| 4 | 2.7024 | 0.5413 | | |
| 5 | 4.5765 | 0.2151 | 1.62041 | 60.3 |
| 6 | 2.1649 | 1.1548 | | |
| 7 | -6.1218 | 0.1812 | 1.84665 | 23.8 |
| 8 | 3.9416 | 2.4127 | | |
| 9 | 19.8239 | 0.7540 | 1.78590 | 44.2 |
| 10 | -5.3279 | 4.7405 | | |
| 11 | 4.5503 | 0.1144 | 1.62041 | 60.3 |
| 12 | 1.3308 | 0.4370 | 1.72825 | 28.5 |
| 13 | ∞ | 0.4200 | | |
| 14 | ∞ (mask) | 0.1698 | | |
| 15 | -2.9620 | 0.1132 | 1.80517 | 25.4 |
| 16 | 2.0657 | 0.4178 | 1.48749 | 70.2 |
| 17 | -2.0657 | 0.2264 | | |
| 18 | ∞ | 2.1065 | 1.51633 | 64.1 |
| 19 | ∞ | 1.0246 | | |
| 20 | 5.5926 | 0.7280 | 1.48749 | 70.2 |
| 21 | -3.3213 | 0.0226 | | |
| 22 | 4.4673 | 0.7971 | 1.48749 | 70.2 |
| 23 | -2.7695 | 0.1585 | 1.84665 | 23.8 |
| 24 | -14.6198 | 0.3068 | | |
| 25 | ∞ | 0.2135 | 1.51633 | 64.1 |
| 26 | ∞ | 1.9247 | 1.80100 | 35.0 |
| 27 | ∞ | 0.4366 | 1.51633 | 64.1 |
| 28 | ∞ | | | |

The surfaces with a * to the right of the surface number in Table 20 are aspheric lens surfaces, and the aspheric surface shapes are expressed by Equation (A) above.

Table 21 below lists the values of the constant K and the aspheric coefficients $A_2$–$A_5$ used in Equation (A) above for each of the aspheric lens surfaces of Table 20. Aspheric coefficients that are not present in Table 21 are zero. An "E" in the data indicates that the number following the "E" is the exponent to the base 10. For example, "1.0E-2" represents the number $1.0 \times 10^{-2}$.

TABLE 21

| # | K | $A_2$ | $A_3$ | $A_4$ | $A_5$ |
|---|---|---|---|---|---|
| 1 | 1.4139 | 6.6866E−3 | −3.0539E−4 | 1.5277E−5 | −3.6657E−7 |
| 2 | 0.5234 | 4.9096E−3 | −1.6165E−4 | −9.6354E−6 | 3.8909E−7 |

The projection display device of Embodiment 8 satisfies Conditions (A)–(C) above, as set forth in Table 22 below.

TABLE 22

| Condition | Condition Inequality | Value |
|---|---|---|
| (A) | 1.0 < f2/f < 8.0 | 3.64 |
| (B) | LVD/{4 · (1 − 2 · tan θ)} < Bf < LVD/(1 − 2 · tan θ') + LVD | 2.15 |
| (C) | 0.25 < d/f2 < 1.0 | 0.73 |

Figures 22A, 22B, 22C, 22D:
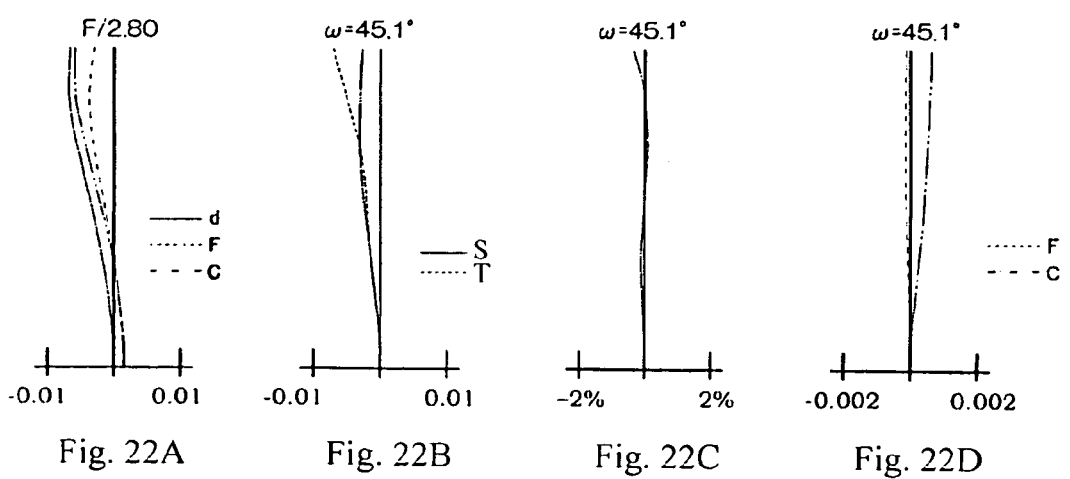
FIGS. 22A–22D show the spherical aberration, astigmatism, distortion, and lateral color, respectively, of the projection lens according to Embodiment 8.

FIGS. 22A–22D show the spherical aberration, astigmatism, distortion, and lateral color, respectively, of the projection lens according to Embodiment 8 with the distance to the enlarging side imaging point (the screen position) from the lens surface on the reducing end of the projection lens being 79.9 mm. In FIG. 22A, the spherical aberration is shown for the d-line (λ=587.6 nm), the F-line (λ=4.86 nm), and the C-line (λ=656.3 nm). As shown in FIG. 22A, the f-number is 2.80. In FIG. 22B, the astigmatism is shown at the d-line (λ=587.6 nm) for both the sagittal image surface S and the tangential image surface T. In FIG. 22C, the distortion is shown at the d-line (λ=587.6 nm). The half-field angle ω for FIGS. 22B–22D is 45.1°. FIG. 22D shows the lateral color at the F-line (λ=4.86 nm) and the C-line (λ=656.3 nm) relative to the d-line (λ=587.6 nm). As is apparent from these figures, the various aberrations are favorably corrected.

Hence, this projection display device achieves excellent optical performance with a compact design and makes production at low cost possible with a suitable wide-angle projection lens.

Generally, polarized beam splitting prisms (PBSs) are subject to changes in properties depending on working conditions. The polarized beam splitting properties used as design criteria may not be maintained under some changes in pressure and temperature. Particularly, changes in properties readily occur with PBS materials that are inexpensive or that are lead-free in order to be environmentally friendly. These materials may cause uneven color and deteriorated contrast. In order to resolve these problems, the structure in which PBSs are exchangeable depending on working conditions and the other elements being used without being exchanged allows for a highly versatile projection display device that includes a highly versatile projection lens system with reliable performance and low cost. The lenses that are replaced in accordance with the exchange of the PBSs are not limited to some lenses of the first lens group and the entire second lens groups described above. Other alternatives include replacing only lenses of the first lens group or replacing only some lenses of the second lens groups.

Embodiment 9

Figure 13A:
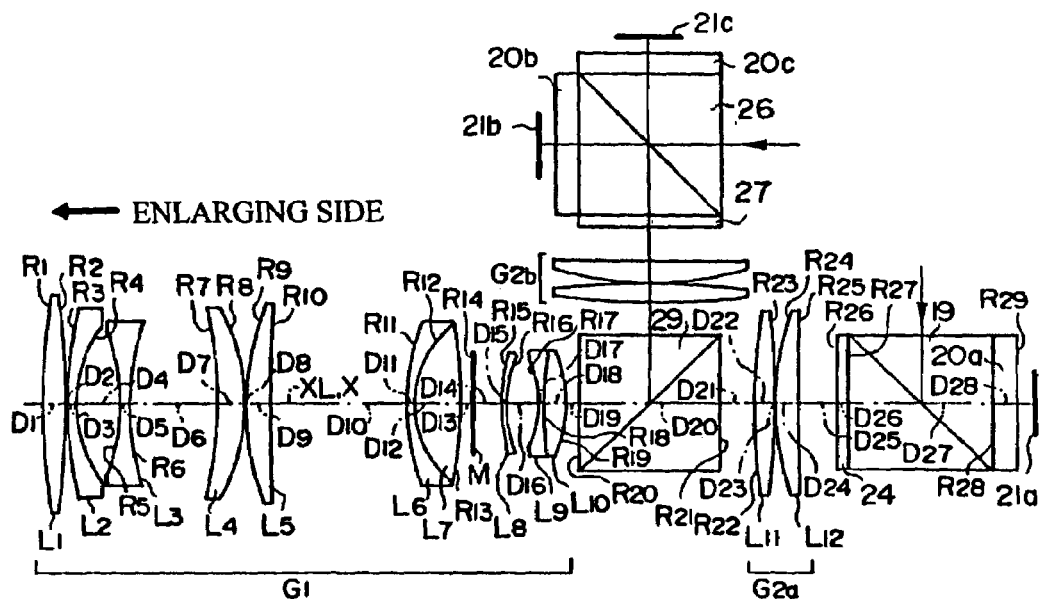
FIG. 13A shows a plan view of a projection display device according to Embodiment 9 and FIG. 13B shows a side view of a projection lens portion of the projection display device of FIG. 13A.
Figure 13B:
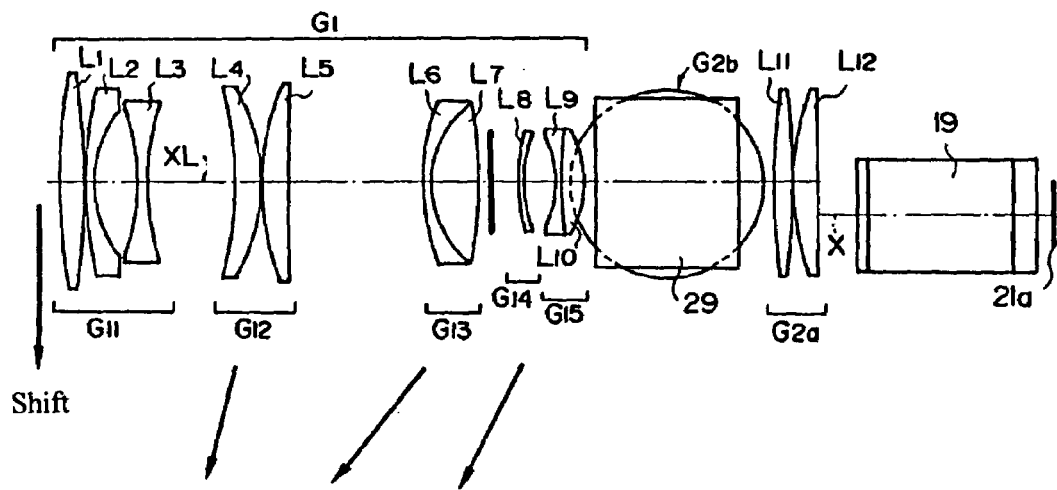

FIG. 13A shows a plan view of a projection display device according to Embodiment 9 and FIG. 13B shows a side view of a projection lens portion of the projection display device of FIG. 13A. FIG. 13A shows the structure of the projection lens with a second lens group G2a and corresponding RLCD 21a represented in the manner discussed earlier with regard to FIG. 2 and Embodiment 1. The second lens groups G2a and G2b have the same structure.

The projection lens according to Embodiment 9 is a zoom lens, as in Embodiment 2. The first lens group G1 of this projection lens includes, arranged in order from the enlarging side, a lens group G11 consisting of a first lens element L1, a second lens element L2, and a third lens element L3, a lens group G12 consisting of a fourth lens element L4 and a fifth lens element L5, a lens group G13 consisting of a sixth lens element L6 and a seventh lens element L7, a lens group G14 consisting of an eighth lens element L8, and a lens group G15 consisting of a ninth lens element L9 and a tenth lens element L10. The second lens groups G2a and G2b comprise an eleventh lens element L11 and a twelfth lens element L12. The lens distance within the second lens groups and the group distance between the first lens group and second lens groups are fixed.

FIGS. 13A and 13B show the lens geometry of the projection lens at the wide-angle end, and the four downwardly directed arrows of FIG. 13B indicate generally the direction of movement of the four lens groups G11, G12, G13, and G14 along the optical axis during zooming from the wide-angle end to the telephoto end. The lens group G11 on the enlarging end of the first lens group G1 is fixed during zooming and has negative refractive power. The projection lens of this embodiment is as efficient as the projection lens of Embodiment 2.

Table 23 below lists the surface number #, in order from the enlarging side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element of the projection lens of Embodiment 9. The numerical values of R and D in Table 23 are based on a normalized focal length of 1 mm at the wide-angle end of the zoom lens of Embodiment 9 (i.e., with the zoom lens focused at infinity). For Embodiment 9, the diagonal dimension LVD of the display elements (RLCDs) is 0.69 mm and the f-number $F_{NO}$ of the projection lens of Embodiment 9 based on Table 23 is 2.41.

TABLE 23

| # | R | D | $N_d$ | $v_d$ |
|---|---|---|---|---|
| 1 | 4.3446 | 0.1389 | 1.77250 | 49.6 |
| 2 | −6.0080 | 0.0070 | | |
| 3 | 2.4977 | 0.0586 | 1.62041 | 60.3 |
| 4 | 0.8211 | 0.2628 | | |
| 5 | −1.3839 | 0.0517 | 1.80100 | 35.0 |
| 6 | 1.5584 | D6 (variable) | | |
| 7 | −2.7152 | 0.1533 | 1.83400 | 37.2 |
| 8 | −1.3940 | 0.0069 | | |
| 9 | 1.7312 | 0.1456 | 1.84665 | 23.8 |
| 10 | 12.1718 | D10 (variable) | | |
| 11 | 1.4191 | 0.0483 | 1.78469 | 26.3 |
| 12 | 0.6527 | 0.2811 | 1.66672 | 48.3 |
| 13 | −3.6634 | D13 (variable) | | |

TABLE 23-continued

| # | R | D | $N_d$ | $v_d$ |
|---|---|---|---|---|
| 14 | ∞ (mask) | 0.1724 | | |
| 15 | 1.2397 | 0.0310 | 1.84665 | 23.8 |
| 16 | 0.7965 | D16 (variable) | | |
| 17 | −0.7007 | 0.0310 | 1.72825 | 28.5 |
| 18 | 2.5438 | 0.1350 | 1.62041 | 60.3 |
| 19 | −0.7745 | 0.0690 | | |
| 20 | ∞ | 0.8622 | 1.51633 | 64.1 |
| 21 | ∞ | 0.2069 | | |
| 22 | 4.4739 | 0.1085 | 1.84666 | 23.8 |
| 23 | −6.7067 | 0.0069 | | |
| 24 | 1.8223 | 0.1387 | 1.71230 | 53.9 |
| 25 | 30.0426 | 0.2242 | | |
| 26 | ∞ | 0.0650 | 1.51633 | 64.1 |
| 27 | ∞ | 0.8622 | 1.84138 | 24.6 |
| 28 | ∞ | 0.1330 | 1.51633 | 64.1 |
| 29 | ∞ | | | |

Table 24 below lists the values of the variables D6, D10, D13, and D16 (i.e., the group spacings) at the wide-angle and telephoto settings of the projection lens of Embodiment 9.

TABLE 24

| Setting | D6 | D10 | D13 | D16 |
|---|---|---|---|---|
| Wide-angle | 0.5441 | 0.7967 | 0.0758 | 0.1967 |
| Telephoto | 0.3878 | 0.4514 | 0.2658 | 0.5083 |

The projection display device of Embodiment 9 satisfies Conditions (A)–(C) above, as set forth in Table 25 below.

TABLE 25

| Condition | Condition Inequality | Value |
|---|---|---|
| (A) | $1.0 < f2/f < 8.0$ | 1.47 |
| (B) | $LVD/\{4 \cdot (1 - 2 \cdot \tan \theta)\} < Bf < LVD/(1 - 2 \cdot \tan \theta') + LVD$ | 0.93 |
| (C) | $0.25 < d/f2 < 1.0$ | 0.57 |

Figures 23A, 23B, 23C, 23D:
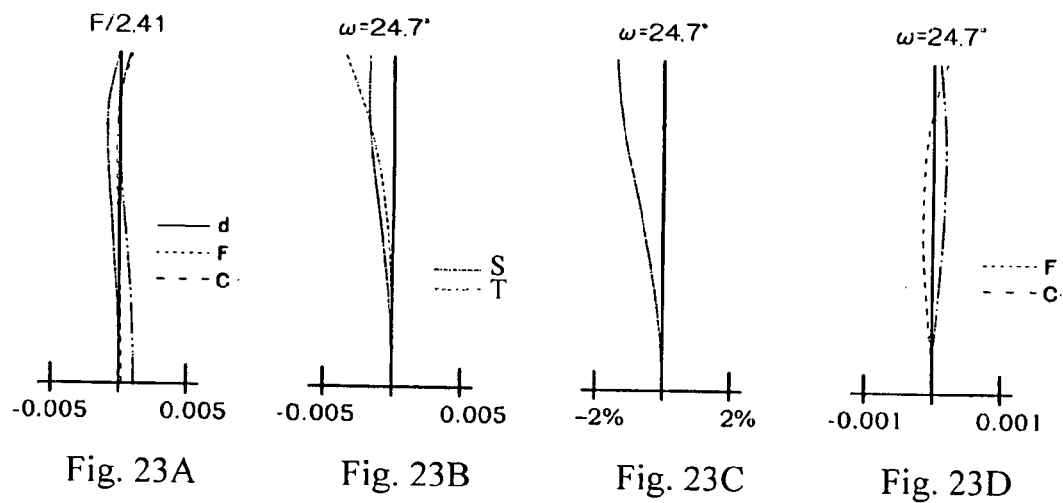
FIGS. 23A–23D show the spherical aberration, astigmatism, distortion, and lateral color, respectively, of the projection lens according to Embodiment 9 at the wide-angle end.
Figures 24A, 24B, 24C, 24D:
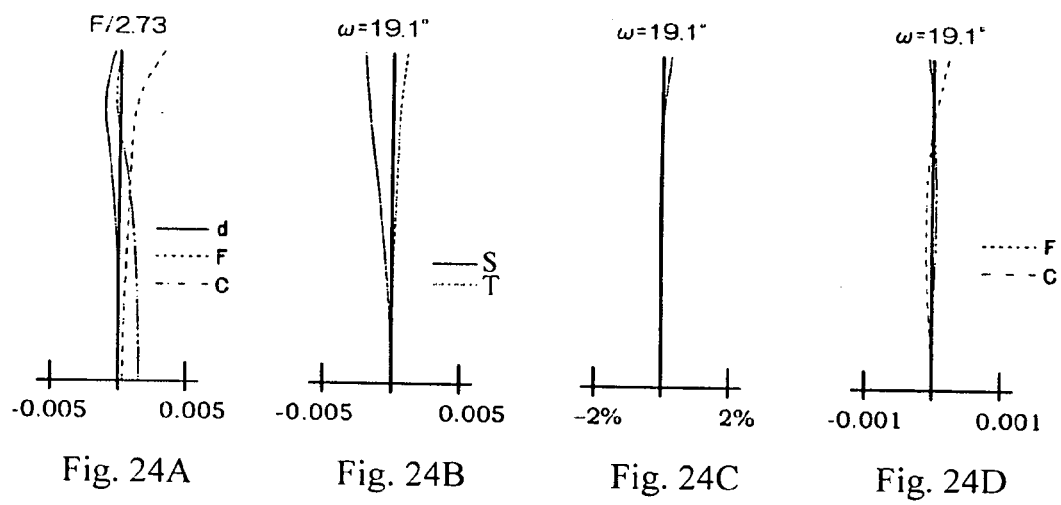
FIGS. 24A–24D show the spherical aberration, astigmatism, distortion, and lateral color, respectively, of the projection lens according to Embodiment 9 at the telephoto end.

FIGS. 23A–23D show the spherical aberration, astigmatism, distortion, and lateral color, respectively, of the projection lens of Embodiment 9 at the wide-angle end. FIGS. 24A–24D show the spherical aberration, astigmatism, distortion, and lateral color, respectively, of the projection lens of Embodiment 9 at the telephoto end. In both cases, the distance to the enlarging side imaging point (the screen position) from the lens surface on the reducing end of the projection lens is 110.4 mm. In FIGS. 23A and 24A, the spherical aberration is shown for the d-line ($\lambda$=587.6 nm), the F-line ($\lambda$=4.86 nm), and the C-line ($\lambda$=656.3 nm). In the remaining figures, $\omega$ is the half-field angle ($\omega$=24.7° at the wide-angle end and $\omega$=19.1° at the telephoto end). In FIGS. 23B and 24B, the astigmatism is shown for the sagittal image surface S and the tangential image surface T. In FIGS. 23C and 24C, distortion is measured at 587.6 nm (the d-line). In FIGS. 23D and 24D, the the lateral color is shown for the F-line ($\lambda$=4.86 nm) and the C-line ($\lambda$=656.3 nm) relative to the d-line ($\lambda$=587.6 nm). As is apparent from these figures, the various aberrations are favorably corrected over the entire range of zoom.

Using a projection display device of Embodiment 9 including the projection lens described above of Embodiment 9 enables a compact efficient projection display device.

The projection display device of Embodiment 9, including the projection lens described, may use elements that are the same or very similar to those of Embodiment 1, although various such elements are not shown in FIGS. 13A–13B, including elements on the reducing side of the illumination PBSs 19 and 26, such as the light source itself, an integrator optical system, or a polarization conversion optical system. The projection display device, including the projection lens of Embodiment 9 as shown in FIGS. 13A–13B, operates efficiently as a compact projection display device.

As shown in the side view of FIG. 13B, the optical axis XL of the projection lens is shifted in relation to the optical axis X of the RLCD 21a and PBS 19. In this projection display device, the first lens group G1, the dichroic prism 29 as the optical combiner, and the second lens groups G2a and G2b, which form the projection lens, are movable together in the direction orthogonal to the optical axis. This is for complying with the general usage of the projection display device wherein upward projection is often applied.

Embodiment 10

Figure 25:
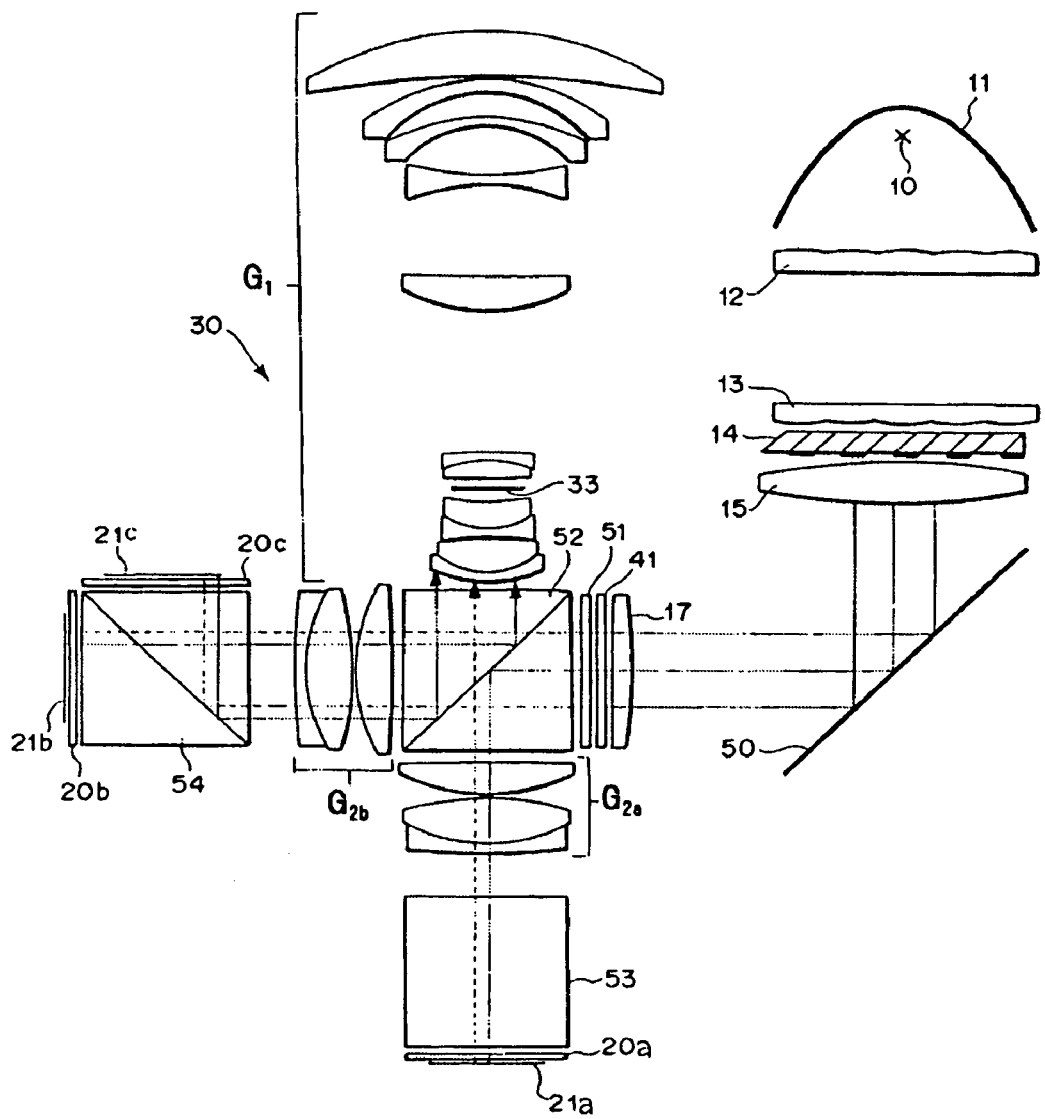
FIG. 25 shows a cross-sectional view of a projection display device according to Embodiment 10.

FIG. 25 shows a cross-sectional view of a projection display device according to Embodiment 10. As shown in FIG. 25, a PBS 52 serves both as the optical combiner of the projection lens 30 and as a light separating structure for dividing the illumination light according to color. In Embodiment 10, a projection lens like that of the projection lens of Embodiment 1 is used, but other projection lenses may be used.

The optical structure on the reducing side of the condenser lens 17 of the projection display device of Embodiment 10 is nearly the same as in Embodiment 1. A total reflection mirror 50 is additionally provided to fold the optical path. In Embodiment 10, a wavelength specific polarization conversion element 51 for converting the polarization of light having a specific wavelength to linear polarization at a predetermined angle and a PBS 52 for separating incident light depending on polarizations serve as a color separating structure. The light beam polarized by the polarization conversion optical system 14 is adjusted for shifts of the polarization direction by a polarizing plate 41 on the enlarging side of condenser lenses 15 and 17. Then, the second and third color light beams are converted to the P polarized state by the wavelength specific polarization conversion element 51 before they reach the PBS 52. The PBS 52 separates incident light into the first color light beam and the other, second and third, color light beams depending on their polarizations and sends them in different directions. The PBS 52 reflects the S polarized first color light beam at a right angle and transmits the P polarized second and third color light beams by using an inner polarized light separation coating. The first color light beam reflected by the PBS 52 is guided to the RLCD 21a for image modulation of the first color light via the second lens group G2a and a glass prism 53.

The second and third color light beams are transmitted through the PBS 52 to a dichroic prism 54 via the second lens group G2b. The dichroic prism 54 is a glass prism that includes a dichroic coating consisting of a dielectric multi-layer coating that reflects the third color light. Entering the dichroic coating at a right angle, the second color light beam is transmitted through the dichroic prism 54 to illuminate the RLCD 21b for image modulation of the second color light beam. The third color light beam is reflected within the dichroic prism 54 to illuminate the RLCD 21c for image modulation of the third color light beam.

The light beams reflected by the RLCDs 21a to 21c and carrying the respective color image information travel along the same optical path in the reverse direction to return to the PBS 52 as the optical combiner with polarizations opposite to when they previously exited the PBS 52. Therefore, the first color light beam is transmitted through the PBS 52 and the second and third color light beams are reflected by it, so that the three light beams are combined and projected in the same direction. Quarter-wavelength plates 20a, 20b, and 20c for improving the contrast of a projected image are provided before the RLCDs 21a to 21c. The polarizing plate 41 adjusts shifts of the polarization directions, which improves the efficiency of light usage and prevents deterioration in image contrast. The glass prism 53 is provided to make the optical path length of the first color light beam equal to those of the second and third color light beams.

In Embodiment 10, the PBS 52, which is the optical combiner of the projection lens 30, serves as a color separating/combining system so that white light emitted from the light source is separated into the first color light beam and the other, second and third, color light beams that exit the PBS 52 in one of two different directions. Then, the first color light beam and the other, second and third, color light beams are reflected and modulated with image information by the RLCDs 21a, 21b, and 21c. Then, the modulated light beams enter the PBS 52 from one of two different directions and are combined and projected from the PBS 52 in one direction. The second lens groups G2a and G2b of the projection lens 30 are provided in the optical paths of the color light beams that are separated and combined by the PBS 52. The second lens group G2a and the first lens group, as well as the second lens group G2b and first lens group G1, form the projection lens 30.

In Embodiment 10, the PBS 52, which is the optical combiner, and the second lens groups G2a and G2b are provided in the optical path of the illumination optical system. Thus, they serve as part of the illumination optical system that guides light from the integrator optical system to the light valves RLCD 21a, RLCD 21b, and RLCD 21c. With the PBS 52 also providing color separation, this eliminates the use of a dichroic mirror to provide initial color separation. This reduces the number of optical elements and allows a more compact projection display device. Also with this structure, only one PBS is used, which reduces cost and weight compared to projection display devices with more PBSs, which enables realizing a more environmentally friendly structure.

Embodiment 11

Figure 26:
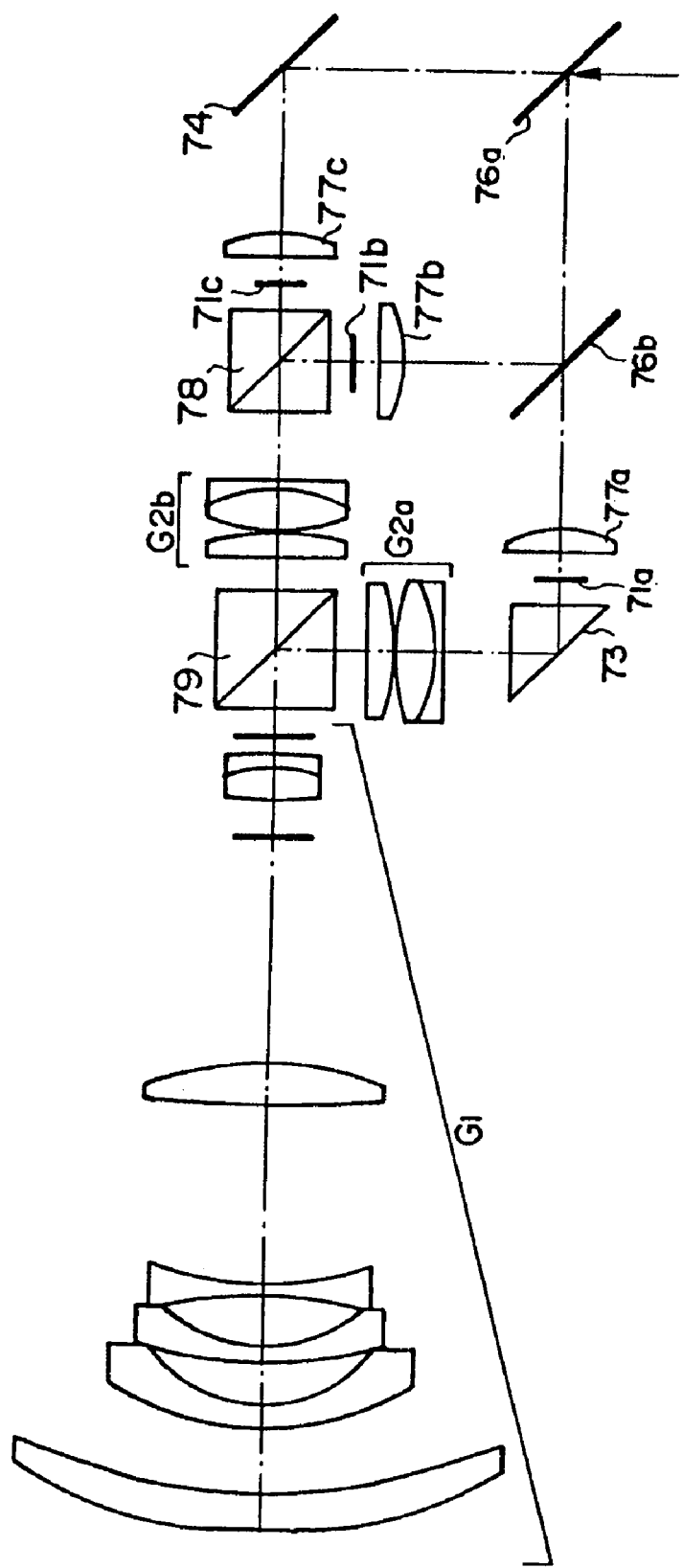
FIG. 26 shows a cross-sectional view of a projection display device according to Embodiment 11.

FIG. 26 shows a cross-sectional view of a projection display device according to Embodiment 11. As shown in FIG. 26, in Embodiment 11 the display elements for modulation of the different color light beams with image information consist of transmission-type liquid crystal display panels (hereinafter termed TLCDs). In Embodiment 11, a projection lens like that of projection lens 30 of Embodiment 6 is used, but other projection lenses may be used.

Figure 30:
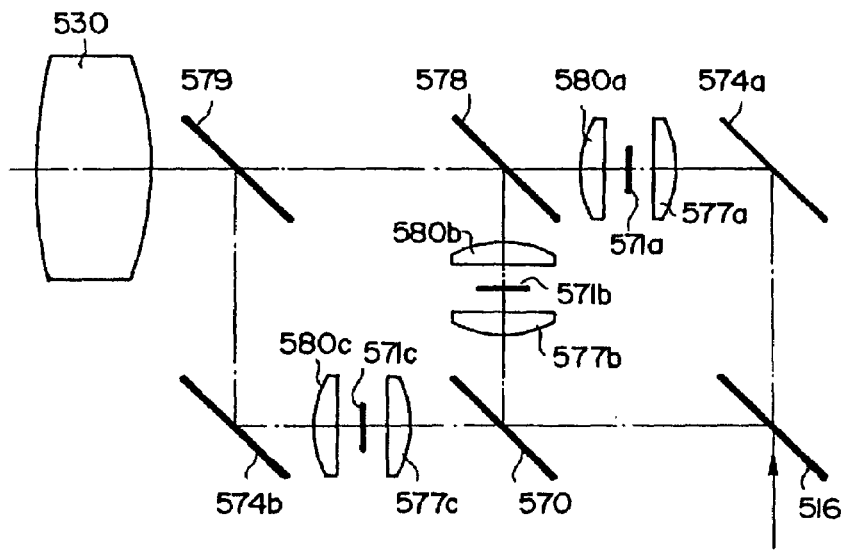
FIG. 30 shows a cross-sectional view of a third prior art projection display device.
Figure 31:
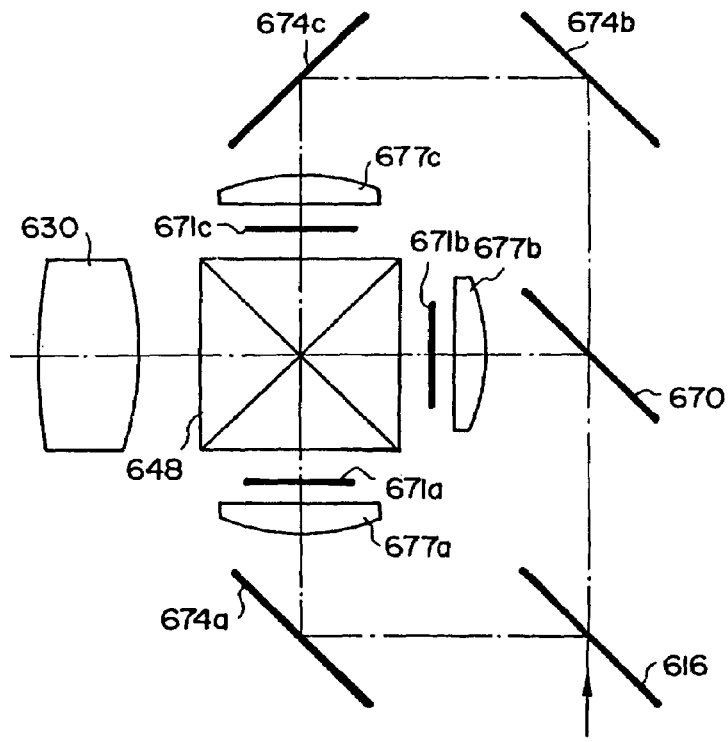
FIG. 31 shows a cross-sectional view of a fourth prior art projection display device.

The projection display device of Embodiment 11, including the projection lens described, may use elements that are the same or very similar to those of Embodiment 1, although elements on the reducing side of dichroic mirror 76a, which is a color separating structure, such as a light source, an integrator optical system, or a polarization conversion optical system are omitted in FIG. 26. The process in which white light from a light source (not shown) is separated into three color light beams, for example, green, blue, and red, which are then made to carry image information by the TLCDs 71a, 71b, and 71c corresponding to the respective color light beams is nearly the same as in prior art FIG. 30. In Embodiment 11, dichroic mirrors 76a and 76b, condenser lenses 77a to 77c, and a total reflection mirror 74 are provided for color separation. The color light beams transmitted through the TLCDs 71a, 71b, and 71c and carrying the image information are combined via dichroic prisms 78 and 79 (the dichroic prism 79 corresponding to the optical combiner of the projection lens of previous embodiments) and projected by the first lens group G1 and second lens group G2a or the first lens group G1 and second lens group G2b operating as the projection lens. A total reflection prism 73 is provided in the optical path of the projection light beam on the enlarging side of the TLCD 71a.

As Embodiment 11 demonstrates, in the projection display device of the present invention, display elements are not restricted to reflection-type liquid crystal display panels (RLCDs); the display elements may also be transmission-type liquid crystal display panels (TLCDs). The diagonal dimension of light valves LVD of such TLCDs may satisfy Condition (B) above in the same manner as RLCDs. The projection display device of the present invention, using transmission-type liquid crystal panels (TLCDs), as in Embodiment 11, is efficient and uses an efficient projection lens.

Embodiment 12

Figure 27:
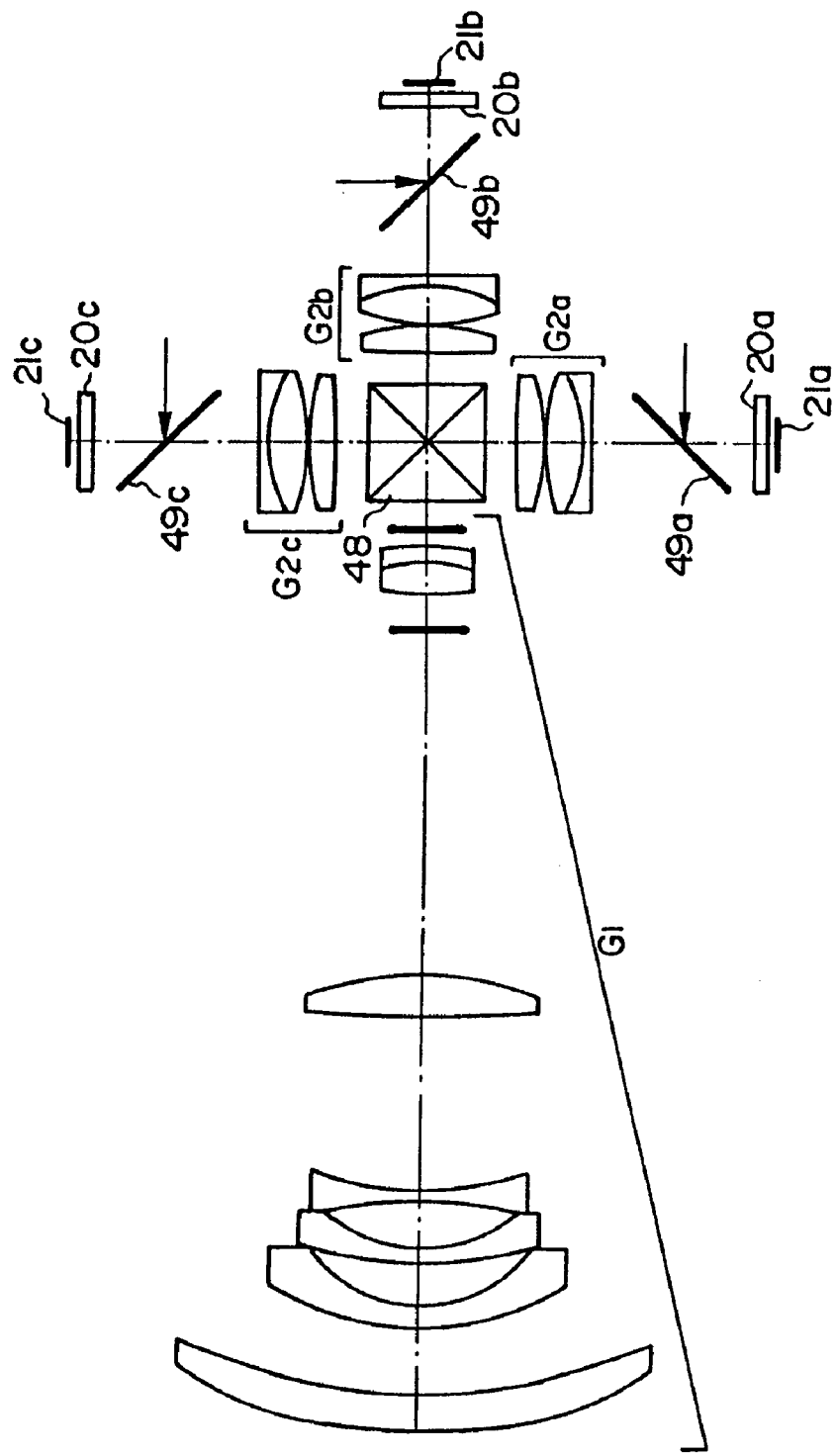
FIG. 27 shows a cross-sectional view of a projection display device according to Embodiment 12.
Figure 28:
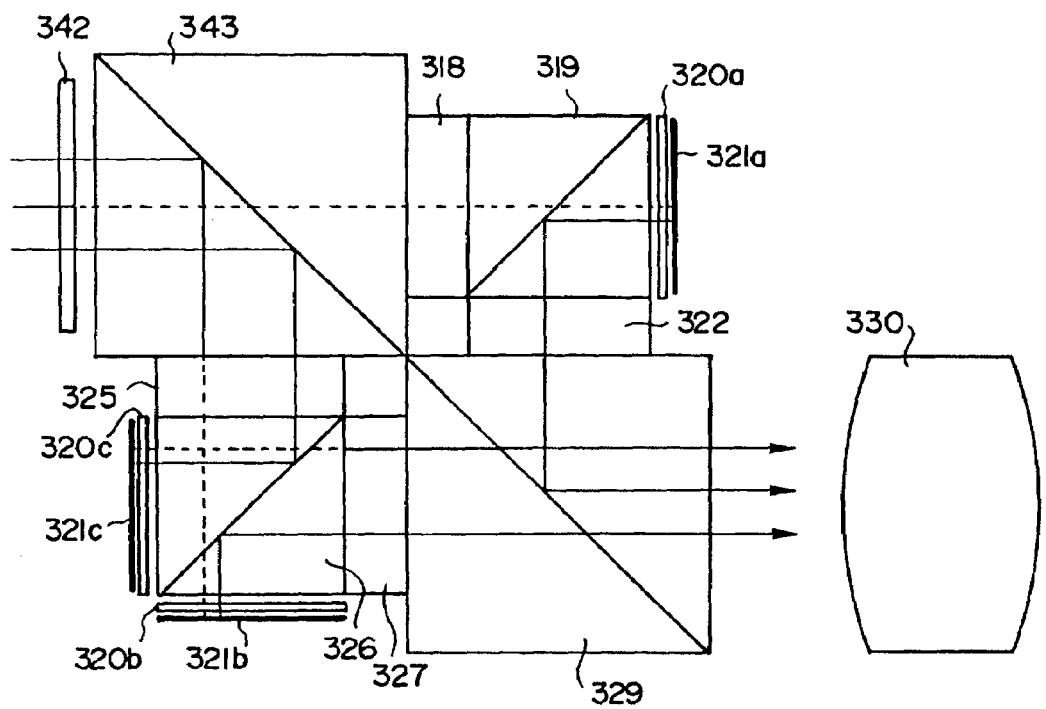
FIG. 28 shows a cross-sectional view of a first prior art projection display device.
Figure 29:
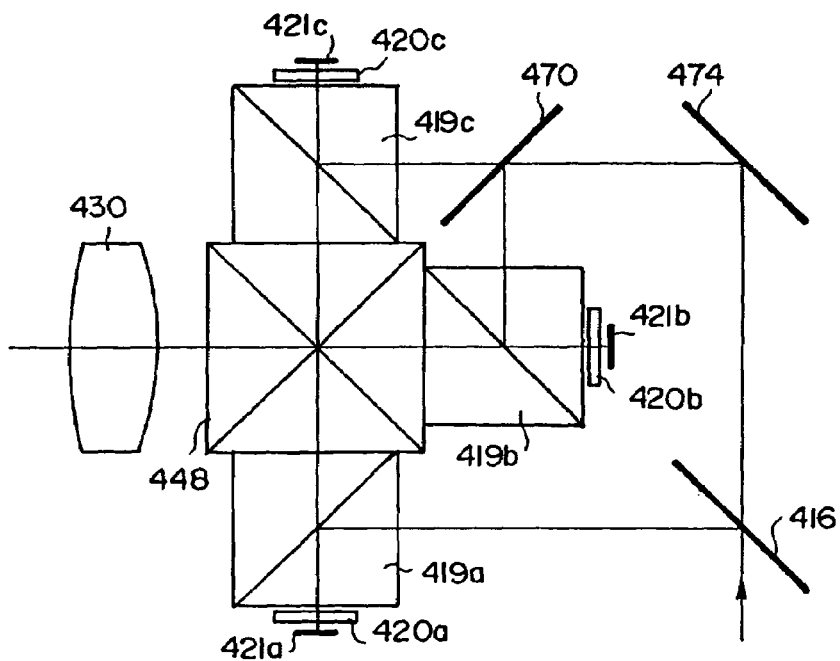
FIG. 29 shows a cross-sectional view of a second prior art projection display device.

FIG. 27 shows a cross-sectional view of a projection display device according to Embodiment 12. As shown in FIG. 27, in Embodiment 12 PBSs are used as the light separating structures for separating the illumination light beam from the projection light beam. In Embodiment 12 a projection lens like that of the projection lens of Embodiment 6 is used, but other projection lenses may be used.

The projection display device of Embodiment 12 has nearly the same structure as that of Embodiment 6 (FIG. 11). However, the PBSs 19a to 19c and polarizing plates 24a to 24c of Embodiment 6 are replaced with polarized beam splitting plates 49a to 49c. An element for separating the illumination light beam from the projection light beam based on linear polarization states in a projection-type display apparatus is not restricted to a known structure of two right angle triangular prisms with a coating on their bonded surfaces. A cubic prism having the same shape as the prior art structure but consisting of two right angle triangular prisms with a PBS plate with coatings in a lattice pattern between their bases can be used. In this embodiment, a flat polarized beam splitting plate of the wire-grid-type can be also used. Such plates of the wire-grid-type offer improved polarization separation angles.

A prism element is not necessarily provided between the second lens groups G2a and G2b and the respective display elements in the projection display device of the present invention, regardless of whether or not a light combining structure at a later stage is an X-shaped dichroic prism. A flat element not attached to a prism or prisms can also be used depending on considerations of cost and tolerance of acceptable aberrations. Also in such cases, the projection display device of the present invention is efficient and uses an efficient projection lens.

The projection display device, including the projection lens, according to the present invention is not restricted to the embodiments and variations thereof described above. Various other modifications may also be made. For example, it is particularly important to correct chromatic aberration for optical performances of a projection lens. In the present invention, at least one of multiple second lens groups at least partly consists of lens elements that may be different in shape and/or material from lens elements of the other second lens groups, whereby chromatic aberration is efficiently corrected. The shape above refers to the radius of curvature and center thickness of the lens element and the material refers to the refractive index and Abbe number of the lens element.

In the projection lens of the present invention, the separated color light beams pass through one of the multiple second lens groups. A second lens group through which a single color light beam passes, for example, a second lens group G2a in FIG. 1, is constituted so as to exhibit an improved chromatic aberration for the particular color light beam in order to improve overall chromatic aberration correction of the entire projection lens. An element through which multiple color light beams pass should be made of expensive glass material in order to highly correct chromatic aberrations of light beams of different colors. The projection lens of the present invention uses a second lens group through which a single color light beam passes. That second lens group can be advantageously used for low cost and major correction of chromatic aberration. When the projection lens Consisting of the first lens group G1 and second lens group G2a has a significantly different focal length from the projection lens consisting of the first lens group G1 and second lens group G2b, images projected on a screen are different in size. Therefore, a certain range is preferably applied to the lens elements in terms of differences in shape and/or material. Among the three color light beams, it is difficult to correct chromatic aberration for the blue light beam. Therefore, a second lens group corresponding to this color light beam separately is preferably provided.

Another technique for simply correcting chromatic aberration is to make at least one of the multiple second lens groups movable in the optical axis direction so that the optical path length between this one second lens group and the first lens group is different from the optical path length between the other second lens groups and the first lens group. In this case also, a second lens group corresponding to the blue light beam is preferably made movable in order to provide the desired difference. The structure for adjusting the second lens group can also be used to adjust the focal length in order to compensate for other imaging problems as well as for chromatic aberration.

When this is done, in general terms, the projection optical axis of the first lens group and each of the separate optical axes of each of the plurality of second lens groups define a separate device optical axis, each of which passes through the optical combiner, and at least one of the plurality of second lens groups is movable along its separate optical axis in order to vary the optical path length along its separate device optical axis between the one of the plurality of second lens groups and the first lens group so that the optical path length is different from the optical path length along a different device optical axis between another of the plurality of second lens groups and the first lens group.

The projection display device of the present invention can be applied to display elements other than RLCDs and TLCDs or similar display elements. For example, the projection display device of the present invention may use multiple DMDs as display elements.

Additionally, the projection display device of the present invention is not confined to the projection lens using a dichroic prism as the optical combiner; PBSs can be used. PBSs are not used in embodiments described above because PBSs make it difficult to maintain the polarization properties and have a risk of reducing efficiency of light usage and image contrast in a projection display device. Furthermore, those that avoid disturbing the polarization properties may be expensive and heavy and may even cause environmental problems due to high lead content. However, PBSs are not excluded from the optical combiners of projection lenses of the projection display devices of the present invention.

Additionally, an example of how the projection display device of the present invention may be modified within the scope of the invention includes any color light beam being reflected or transmitted during separation or combining of the three color light beams. In order to achieve this, the display elements corresponding to the respective color light beams can be-appropriately positioned as desired. It is preferred that the illumination light beam entering the initial color separating structure be uniformly polarized; however, it is not restricted to the S polarized state, but can be the P polarized state. As for the separating and combining process and polarizations of the three color light beams, the coating properties and positions of the color separating structures, the PBSs before the display elements and a color combiner are determined as appropriate, whereby the three color light beams illuminate the display elements corresponding to the respective color light beams. Polarizing plates and wavelength specific polarization conversion elements can be provided as appropriate.

For example, where the resolution of the apparatus is emphasized, it is preferred that the green light, to which the human eye is most sensitive, has the least number of reflections between the display element and the projection screen. Where the contrast of the apparatus is emphasized, it is taken into account in designing the surfaces for separating or combining polarized light beams that reflectance of S polarized light is usually higher than transmittance of P polarized light. In some cases, the green light is preferably reflected between the display element and the projection screen depending on the polarization state of the green light and the positions of the display elements corresponding to the three color light beams. Furthermore, the optimum geometry varies depending on various requirements such as brightness and thermal issues.

The projection display device of the present invention has different structures depending on whether it is used as a front projector or a rear projector and the display elements are positioned in relation to the light separating structures. According to requirements, the optical path may be folded any number of times and in any direction. However, a smaller number of foldings of the light path results in increasing the light efficiency (due to each reflecting surface causing a loss of light) which is advantageous in terms of brightness as well as assembly accuracy and cost.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection display device for enlarging and projecting an image along a projection optical axis, comprising:
    a first lens group arranged on the projection optical axis on the enlarging end of the projection display device;

a plurality of display elements, each modulating a different one of a plurality of light beams with image information;

an optical combiner for receiving from at least two different directions light beams modulated by the different display elements, combining the modulated light beams, and directing the combined modulated light beams along an optical axis to the first lens group;

a plurality of second lens groups, each having positive refractive power and each arranged on a separate optical axis so that a different one of the light beams modulated by a different display element is incident on the optical combiner after passing through one of the second lens groups;

wherein the following conditions are satisfied by the projection display device for each of the plurality of second lens groups:

$1.0 < f2/f < 8.0$ $LVD/\{4 \cdot (1-2 \cdot \tan \theta)\} < Bf < LVD/(1-2 \cdot \tan \theta') + LVD$ $0.25 < d/f2 < 1.0$ wherein f2 is the focal length of the second lens group;

f is the smallest focal length of the combination in optical series of the first lens group and the second lens group;

LVD is the diagonal dimension of the display element;

Bf is the back focal length of the combination in optical series of the first lens group and the second lens group at the smallest focal length of the combination of the first lens group and the second lens group;

$\theta$ is the angle for which $\sin \theta = 1/(4 \cdot F_{NO})$;

$\theta'$ is the angle for which $\sin \theta' = 1/(2 \cdot F_{NO})$;

$F_{NO}$ is the f-number at the smallest focal length of the combination in optical series of the first lens group and the second lens group; and d is the air-converted distance along the optical axis, defined by the combination in optical series of the first lens group and each of the second lens groups, between the first lens group and each of the second lens groups at the smallest focal length of the combination in optical series of the first lens group and the second lens group.

2. The projection display device of claim 1, wherein:

at least two light beams, each modulated by a different one of the plurality of display elements, are combined and transmitted along a common optical axis before they are incident on a second lens group.

3. The projection display device of claim 2, wherein the optical combiner consists of a dichroic prism that includes a dichroic surface.

4. The projection display device of claim 1, wherein:

the optical combiner consists of an X-shaped dichroic prism that includes two dichroic surfaces for combining light beams from three different directions; and the plurality of second lens groups includes at least three second lens groups.

5. The projection display device of claim 1, wherein:

the first lens group and each of the plurality of second lens groups define a zoom lens associated with each of the plurality of second lens groups;

the optical axis of each zoom lens is formed by the projection optical axis of the first lens group and the separate optical axis of each of the plurality of second lens groups;

the distance along each separate optical axis between lens components of each of the second lens groups remains fixed during zooming;

the first lens group includes at least two lens groups that are movable relative to one another along the projection optical axis of the first lens group during zooming; and the distances along the optical axis of each zoom lens between the lens component of the first lens group that is closest to the optical combiner and each of the lens components of each of the plurality of second lens groups that is closest to the optical combiner changes during zooming or the first lens group includes at least three lens groups that are movable relative to one another along the projection optical axis of the first lens group during zooming.

6. The projection display device of claim 5, wherein the first lens group includes a lens component that is fixed during zooming and has negative refractive power.

7. The projection display device of claim 1, wherein each of the plurality of second lens groups is telecentric or nearly telecentric on the side opposite the enlarging side.

8. The projection display device of claim 1, wherein the first lens group includes a mirror for changing the direction of the projection optical axis of the first lens group.

9. The projection display device of claim 1, wherein the composition of at least two of the plurality of second lens groups is substantially different in terms of at least one surface shape or lens material of at least one lens element.

10. The projection display device of claim 1, wherein:

the projection optical axis of the first lens group and each of the separate optical axes of each of the plurality of second lens groups define separate device optical axes, each of which passes through the optical combiner; and at least one of the plurality of second lens groups is movable along its separate optical axis in order to vary the optical path along its separate device optical axis between the one of the plurality of second lens groups and the first lens group so that the optical path length is different from the optical path length along a different device optical axis between another of the plurality of second lens groups and the first lens group.

11. The projection display device of claim 1, wherein the projection display device is constructed so that at least one lens component of the first lens group may be readily interchanged with another lens component so that the focal length of the projection display device may be easily changed.

12. The projection display device of claim 1, further including a polarization sensitive beam splitter on the side opposite the enlarging side of one of the plurality of second lens groups for separating a light beam illuminating a display element from the light beam modulated by the display element;

the projection display device being constructed so the polarization sensitive beam splitter may be easily interchanged with another polarization sensitive beam splitter; and at least one lens component of at least one of the first lens group and the second lens group on the enlarging side of the polarization sensitive beam splitter being readily interchangeable with another lens component in order to correct changes in imaging performance resulting from changing the polarization sensitive beam splitter being used in the projection display device.

13. The projection display device of claim 1, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

14. The projection display device of claim 1, further comprising an illuminator including:
a light source, an integrator optical system for integrating light from the light source;
an illumination optical system for guiding light from the integrator optical system to the plurality of display elements;
wherein the light from the illuminator is modulated by the plurality of display elements and projected by the projection display device along the projection optical axis to form a projected image.

15. The projection display device of claim 1, wherein the first lens group, the optical combiner, and the plurality of second lens groups are movable together as a unit in a direction orthogonal to the projection optical axis.

16. The projection display device of claim 1, wherein the optical combiner and the plurality of second lens groups receive light from the light source before the light is modulated by a display element.

17. The projection display device of claim 2, wherein:
the first lens group and each of the plurality of second lens groups define a zoom lens associated with each of the plurality of second lens groups;
the optical axis of each zoom lens is formed by the projection optical axis of the first lens group and the separate optical axis of each of the plurality of second lens groups;
the distance along each separate optical axis between lens components of each of the second lens groups remains fixed during zooming;
the first lens group includes at least two lens groups that are movable relative to one another along the projection optical axis of the first lens group during zooming; and
the distances along the optical axis of each zoom lens between the lens component of the first lens group that is closest to the optical combiner and each of the lens components of each of the plurality of second lens groups that is closest to the optical combiner changes during zooming or the first lens group includes at least three lens groups that are movable relative to one another along the projection optical axis of the first lens group during zooming.

18. The projection display device of claim 3, wherein:
the first lens group and each of the plurality of second lens groups define a zoom lens associated with each of the plurality of second lens groups;
the optical axis of each zoom lens is formed by the projection optical axis of the first lens group and the separate optical axis of each of the plurality of second lens groups;
the distance along each separate optical axis between lens components of each of the second lens groups remains fixed during zooming;
the first lens group includes at least two lens groups that are movable relative to one another along the projection optical axis of the first lens group during zooming; and
the distances along the optical axis of each zoom lens between the lens component of the first lens group that is closest to the optical combiner and each of the lens components of each of the plurality of second lens groups that is closest to the optical combiner changes during zooming or the first lens group includes at least three lens groups that are movable relative to one another along the projection optical axis of the first lens group during zooming.

19. The projection display device of claim 4, wherein:
the first lens group and each of the plurality of second lens groups define a zoom lens associated with each of the plurality of second lens groups;
the optical axis of each zoom lens is formed by the projection optical axis of the first lens group and the separate optical axis of each of the plurality of second lens groups;
the distance along each separate optical axis between lens components of each of the second lens groups remains fixed during zooming;
the first lens group includes at least two lens groups that are movable relative to one another along the projection optical axis of the first lens group during zooming; and
the distances along the optical axis of each zoom lens between the lens component of the first lens group that is closest to the optical combiner and each of the lens components of each of the plurality of second lens groups that is closest to the optical combiner changes during zooming or the first lens group includes at least three lens groups that are movable relative to one another along the projection optical axis of the first lens group during zooming.

20. The projection display device of claim 2, wherein:
at least one of the modulated light beams incident from different directions on the optical combiner is a modulated light beam that is linearly polarized and transmitted by the optical combiner; and
the transmittance of the optical combiner is greater for a light beam having the direction of linear polarization of the modulated light beam than for a light beam having a direction of linear polarization orthogonal to the direction of linear polarization of the modulated light beam.

21. The projection display device of claim 3, wherein:
at least one of the modulated light beams incident from different directions on the optical combiner is a modulated light beam that is linearly polarized and transmitted by the optical combiner; and
the transmittance of the optical combiner is greater for a light beam having the direction of linear polarization of the modulated light beam than for a light beam having a direction of linear polarization orthogonal to the direction of linear polarization of the modulated light beam.

22. The projection display device of claim 4, wherein:
at least one of the modulated light beams incident from different directions on the optical combiner is a modulated light beam that is linearly polarized and transmitted by the optical combiner; and
the transmittance of the optical combiner is greater for a light beam having the direction of linear polarization of the modulated light beam than for a light beam having a direction of linear polarization orthogonal to the direction of linear polarization of the modulated light beam.

23. The projection display device of claim 5, wherein:
at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

24. The projection display device of claim 6, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

25. The projection display device of claim 7, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

26. The projection display device of claim 8, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

27. The projection display device of claim 9, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

28. The projection display device of claim 10, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

29. The projection display device of claim 11, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

30. The projection display device of claim 12, wherein:

at least one of the modulated light beams incident from different directions on the optical combiner is a modulated light beam that is linearly polarized and transmitted by the optical combiner; and the transmittance of the optical combiner is greater for a light beam having the direction of linear polarization of the modulated light beam than for a light beam having a direction of linear polarization orthogonal to the direction of linear polarization of the modulated light beam.

\* \* \* \* \*

UNITED STATES PATENT AND TRADEMARK OFFICE
CERTIFICATE OF CORRECTION

PATENT NO. : 7,207,681 B2
APPLICATION NO. : 11/019155
DATED : April 24, 2007
INVENTOR(S) : Chikara Yamamoto It is certified that error appears in the above-identified patent and that said Letters Patent is hereby corrected as shown below:

Column 6
Line 54, change "diagorial" to -- diagonal -- ;

Column 17
Line 57, change "10x10$^{-2}$" to -- 1.0 x 10$^{-2}$ -- ;

Column 18
Lines 16 and 23, change "4.86" to -- 486.1 -- ;

Column 20
Line 5, change "results" to -- result -- ;
Line 62, change "4.86" to -- 486.1 -- ;

Column 21
Line 2, change "4.86" to -- 486.1 -- ;

Column 22
Lines 57 and 64, change "4.86" to -- 486.1 -- ;

Column 25
Lines 26 and 33, change "4.86" to -- 486.1 -- ;

Columns 27 and 29
Lines 36 and 43, change "4.86" to -- 486.1 -- ;

Column 31
Lines 54 and 61, change "4.86" to -- 486.1-- ;

Column 34
Line 5, change "anda" to -- and a -- ;

Column 35
Line 25, change "Consisting" to -- consisting --; and

UNITED STATES PATENT AND TRADEMARK OFFICE
CERTIFICATE OF CORRECTION

PATENT NO. : 7,207,681 B2
APPLICATION NO. : 11/019155
DATED : April 24, 2007
INVENTOR(S) : Chikara Yamamoto It is certified that error appears in the above-identified patent and that said Letters Patent is hereby corrected as shown below:

<u>Column 39</u>
Line 11, change "a light source," to -- a light source; -- .

Signed and Sealed this

Third Day of July, 2007

JON W. DUDAS
*Director of the United States Patent and Trademark Office*